(12) United States Patent  (10) Patent No.: US 7,804,635 B1
Wang et al.  (45) Date of Patent: Sep. 28, 2010

(54) ELECTROCHROMIC THIN-FILM MATERIAL

(75) Inventors: Zhongchun Wang, Santa Rosa, CA (US); Paul P. Nguyen, San Jose, CA (US); Jeremy Alexander Dixon, Santa Rosa, CA (US)

(73) Assignee: Soladigm, Inc., Milpitas, CA (US)

( * ) Notice: Subject to any disclaimer, the term of this patent is extended or adjusted under 35 U.S.C. 154(b) by 43 days.

(21) Appl. No.: 12/407,950

(22) Filed: Mar. 20, 2009

(51) Int. Cl.
*G02F 1/153* (2006.01)
*G02F 1/01* (2006.01)
*G02F 1/15* (2006.01)
*C09K 9/00* (2006.01)

(52) U.S. Cl. .................. 359/273; 252/583; 359/265

(58) Field of Classification Search .......... 252/583; 359/260, 265, 273
See application file for complete search history.

(56) References Cited

U.S. PATENT DOCUMENTS

| 5,202,201 | A | * | 4/1993 | Meunier et al. | ............. 429/322 |
| 6,055,088 | A | * | 4/2000 | Fix et al. | ............. 359/265 |
| 6,337,758 | B1 | * | 1/2002 | Beteille et al. | ............. 359/265 |
| 6,647,166 | B2 | | 11/2003 | Richardson | |
| 6,791,737 | B2 | * | 9/2004 | Giron | ............. 359/265 |
| 6,940,628 | B2 | * | 9/2005 | Giron | ............. 359/265 |
| 7,042,615 | B2 | | 5/2006 | Richardson | |

OTHER PUBLICATIONS

M. Hashimoto et al., "Effect of the Predeposition of Gold, Silver, Tin or Lead on the Growth And Crystallization Processes of Amorphous Antimony Layers," Thin Solid Films, 199 (1991) 71-83.
M. Hashimoto et al., "Nucleation and Growth of Crystallites in Amorphous Antimony Layers on As-Deposited Ultrathin Sublayers of Metal: Copper, Silver, Gold, Tin and Lead," Thin Solid Films, 188 (1990), 95-108.
J.N. Huiberts et al., "Yttrium and lanthanum hydride film with switchable optical properties," Nature, 380, 1996, pp. 231-234.
C.M. Lampert, "Toward large-area photovoltiac nanocells: experiences learned from smart window technology," Solar Energy Materials And Solar Cells 32 (1994) pp. 307-321.
K.S. Novoselov et al., "Electric Field Effect in Atomically Thin Carbon Films," Science 306, (2004), pp. 666-669.
Z. Wu et al., "Transparent, Conductive Carbon Nanotube Films," Science, vol. 305, Aug. 27, 2004, pp. 1274-1276.

* cited by examiner

*Primary Examiner*—David N Spector
(74) *Attorney, Agent, or Firm*—Joseph P. Curtin, L.L.C.

(57) ABSTRACT

One exemplary embodiment of an electrochromic thin-film material comprises a metal-chalcogen compound; and/or a mixture or solid solution of one or more metal-rich metal-chalcogen compounds and/or lithium. One or more of the metals comprise Ti, Zr, Hf, V, Nb, Ta, Cr, Mo, W, Mn, Sb, or Bi, or combinations thereof; and one or more of the chalcogens comprise O, S, Se, or Te, or combinations thereof.

20 Claims, 26 Drawing Sheets

ELECTROCHROMIC THIN-FILM MATERIAL

BACKGROUND

The subject matter disclosed herein relates to thin-film materials that can be utilized in reflection-controllable electrochromic windows (i.e., light-control glass) for buildings, vehicles, aircraft and watercraft. More particularly, the subject matter disclosed herein relates to reflection-controllable electrochromic thin-film materials comprising a metal-chalcogen compound in which one or more of the metals comprise Ti, Zr, Hf, V, Nb, Ta, Cr, Mo, W, Mn, Sb, or Bi, or combinations thereof and one or more of the chalcogens comprise O, S, Se, or Te, or combinations thereof.

Windows and other openings are generally the place where the most heat enters and escapes buildings. For example, during the winter about 48% of the heat produced by a heating system of a building escapes through windows of the building. During the summer, the proportion of heat that enters an air-conditioned room through the windows can reach about 71%. A tremendous energy savings can, therefore, be realized by effectively controlling light and heat entering and escaping through windows. Light-control glass has been developed to control the bi-directional flow of light and heat through a window.

There are several ways that light is controlled by light-control glass. One way is to form an electrochromic material on the glass in which the transmissivity of the electrochromic material reversibly changes upon application of a current or a voltage. Another way is to form a thermochromic material on the glass in which the transmissivity of the thermochromic material changes with temperature. Yet another way is to use a gasochromic material that changes its transmissivity by controlling the atmosphere gas. Of these, electrochromic-based light-control glass has been researched in which a tungsten-oxide thin film is used for the light-control layer. Some commercial products based on this type of electrochromic light-control glass have already appeared.

Conventional electrochromic-based light-control glass, including tungsten-oxide-based versions, all control light by absorbing the light using a light-control layer. A drawback with absorbing the light is that heat is produced and radiated into a room when the light-control layer absorbs light, thereby diminishing the energy-saving effect of the conventional electrochromic light-control glass. To eliminate this drawback, another approach of reflecting light rather than absorbing light has been considered. Accordingly, a material capable of reversibly switching between a mirror state and a transparent state would be useful.

For a long time, such a material capable of switching between a mirror state and a transparent state was not found, but in 1996 a group in the Netherlands discovered a hydride of a rare earth, such as yttrium or lanthanum, switches between a mirror state and a transparent state under the influence of hydrogen. Such a material is conventionally referred to as a "switchable mirror". See, for example, J. N. Huiberts et al., Nature, 380, 1996, 231. The rare-earth hydrides undergo a large change in transmissivity, and have excellent light-control mirror characteristics. Nevertheless, because a rare-earth element is used in the material, there are problems in terms of resources and cost when rare-earth-hydride-based switchable mirrors are used for window coatings and other applications.

Additionally, conventional metal-hydride-based mirrors suffer from poor cycle life due to the reactive nature of the metal film, which is readily attacked by air or water. Notably, water is one component of the electrolyte in electrochromic hydride mirrors, and may be produced during removal of hydrogen from the mirror film in both electrochromic and gasochromic devices. The life-cycle degradation is conventionally inhibited by using additional barrier layers for protecting the active materials and by sealing devices for preventing access of environmental air and water. The former approach of adding barrier layers is difficult to achieve and may not be effective after long periods of use. The latter approach of sealing does not address the problem of internal sources of water or oxygen.

More recently, U.S. Pat. No. 6,647,166 B2 to T. J. Richardson discloses alloys of magnesium and transitional-metals that can be used as switchable-mirror materials, thereby significantly reducing the cost of materials for electrochromic-based light-control glass.

U.S. Pat. No. 7,042,615 B2 to T. J. Richardson discloses the use of a semi-metal, such as antimony, as a switchable-mirror thin-film material based on alloying and de-alloying of the semi-metal with lithium: $Sb+3Li^{+}+3e^{-}=Li_3Sb$. Such elements-based thin-film materials, however, suffer from several severe drawbacks for the following reasons. (1) The electrochromic reaction does not take place until very low potential (about 0.7 V vs. $Li/Li^+$), thus preventing the use of known transparent conducting oxides, such as ITO and FTO, as the transparent electrodes in an electrochromic device. (2) The reaction involves a very large percentage of volume expansion/contraction upon full lithiation/delithiation (about 136% for pure Sb), causing problems of pulverization and de-lamination of the reflective layers. (3) Low-resistivity metals (e.g., Ni and Co) need to be added to the reflective layers to reduce the percentage of volume change and increase the conductivity of the matrix, but the added metal absorbs a significant portion of the incident light and lowers the maximum transmission of an electrochromic window. (4) The electrochromic reaction involving the extruding and re-admission of the non-active metal is a non-topotactic and, thus, poorly reversible reaction. (5) A direct-current voltage higher than about 4 V is needed to drive an electrochromic device employing such an electrochromic material, which accelerates the degradation of an electrochromic device during long-term use or cycling due to side reactions associated with high driving-voltages.

Therefore, there is an urgent need in the electrochromic fields to discover reflection-controllable electrochromic thin-film materials based on intercalation compounds with intrinsic open structures for highly reversible electro-optical switching at a potential compatible with known transparent conducting oxide electrodes.

In U.S. Pat. No. 7,042,615 B2, T. J. Richardson discloses the use of transition-metal dichalcogenides (including $TiS_2$, $NbSe_2$, and $NbTe_2$) as switchable-mirror thin-film materials, based on the contemplation that these semiconducting solids become metallic upon lithium insertion or intercalation (CATHODIC electrochromism). These chalcogen-rich transition-metal chalcogenides, however, show too narrow electro-optical switching ranges or too low coloration efficiencies, if any, to be useful in practical electrochromic devices.

BRIEF DESCRIPTION OF THE DRAWINGS

The subject matter disclosed herein is illustrated by way of example and not by limitation in the accompanying figures in which like reference numerals indicate similar elements and in which.

DETAILED DESCRIPTION

Figure 1:
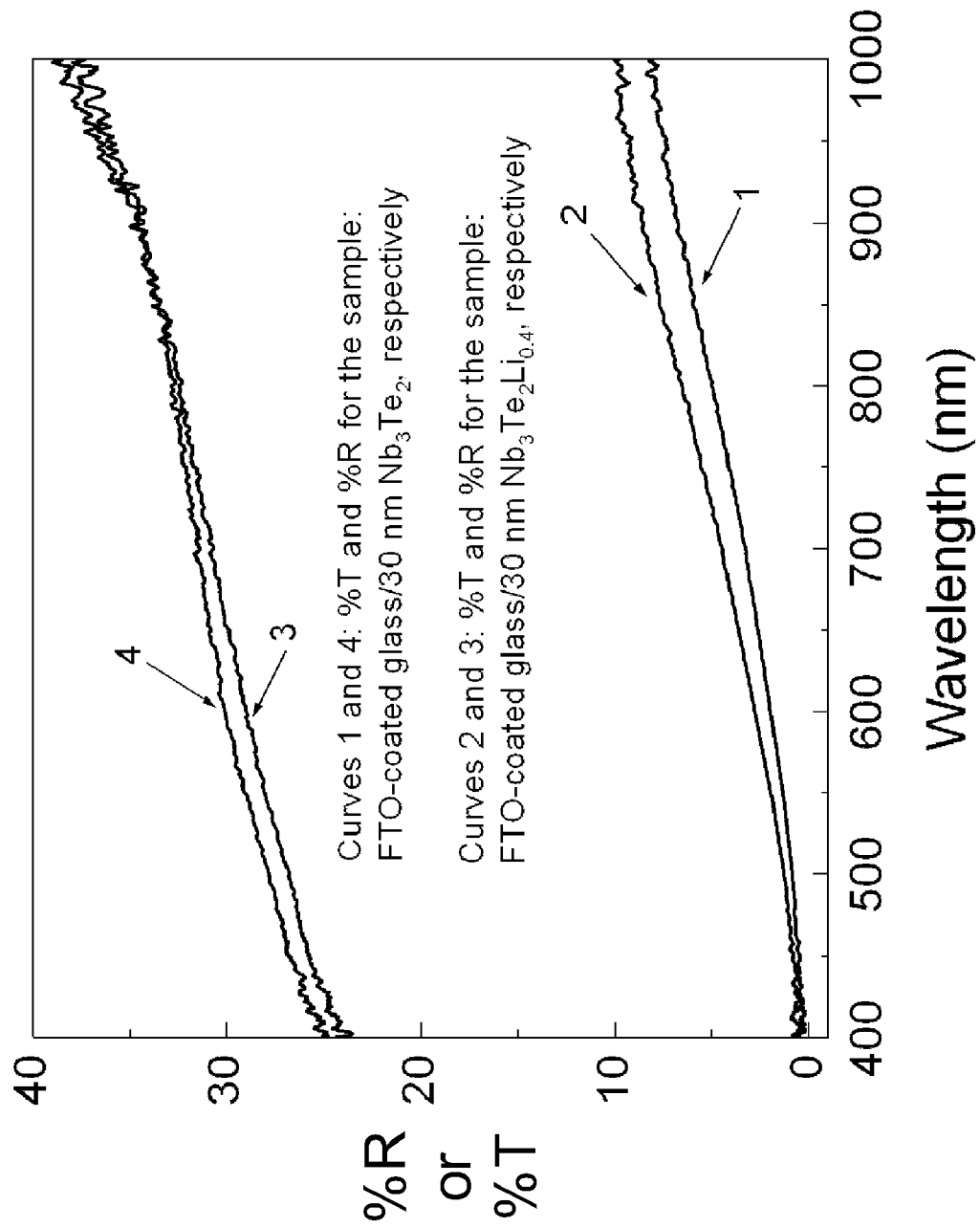
FIG. 1 graphically depicts UV-Vis-NIR transmittance and reflectance spectra for 30-nm $Nb_3Te_2$ and $Nb_3Te_2Li_{0.4}$ thin films deposited on FTO-coated glass substrates.

As used herein, the word "exemplary" means "serving as an example, instance, or illustration." Any embodiment described herein as "exemplary" is not to be construed as necessarily preferred or advantageous over other embodiments. The term "topotactic" refers to solid-state reactions that are characterized by the fact that defined lattice matrix elements specific to the original solid phase remain unaltered in the course of the reaction with respect to their structural organization. The term "chalcogen" refers to any of the elements of O, S, Se, and Te. The term "chalcogen-rich metal chalcogenide" refers to a metal chalcogenide with a chalcogen/metal atomic ratio equal to or greater than about 2. The term "metal-rich metal chalcogenide" refers to a metal chalcogenide with a chalcogen/metal atomic ratio less than about 2. The abbreviation of "ITO" refers to "indium tin oxide", and the abbreviation of "FTO" refers to "fluorine-doped tin oxide".

The subject matter disclosed herein relates to thin-film materials that can be utilized in a reflection-controllable electrochromic window (i.e., a light-control window) for controlling the spectral transmissivity of the window of, for example, a building, a vehicle, an aircraft and a watercraft, without using blinds or curtains. More particularly, the subject matter disclosed herein relates to highly durable reflection-controllable electrochromic thin-film materials that can be used as an electrochromically active layer. One exemplary embodiment of a highly durable reflection-controllable electrochromic thin-film material comprises metal-rich metal-chalcogenide compounds that comprise tellurium, a transition metal, and lithium. Another exemplary embodiment of a highly durable reflection-controllable electrochromic thin-film material comprises metal-rich metal-chalcogenide compounds that comprise tellurium, a main-group metal, and lithium. Suitable transition metals comprise Ti, Zr, Hf, V, Nb, Ta, Cr, Mo, W, Mn and combinations thereof. Suitable main-group metals comprise Sb, Bi, and mixture thereof. One exemplary embodiment of a metal-rich metal-chalcogenide thin-film material comprising tellurium, a transition metal, and lithium, has survived cycling tests in an all-solid-state reflective device for over one thousand cycles with the switching range of transmission degraded less than 10%.

The subject matter disclosed herein also relates to thin-film materials that can also be utilized as anode materials in thin-film lithium-ion batteries. One exemplary embodiment of a metal-rich metal-chalcogenide thin-film material comprising tellurium, a transition metal, and lithium, has exhibited a large charge capacity (about 27000 Coulomb per cubic centimeter) and a high reversibility (over 100 cycles) on charge-discharge cycling between 1.0 V and 2.6 V versus $Li^+/Li$.

In a highly reversible manner, the thin-film materials disclosed herein become transparent upon lithiation, and become reflective and/or absorptive upon delithiation.

The thin-film materials of metal-rich metal chalcogenides disclosed herein show intense and highly reversible ANODIC electrochromism. Specifically, the thin-film materials turn from semi-metallic or metallic (reflective and/or absorptive) into insulators (transparent) in a highly reversible manner upon lithium insertion or intercalation.

Exemplary embodiments of a highly durable reflection-controllable electrochromic thin-film metal-rich metal-chalcogenide material comprise compounds of tellurium, selenium, a transition metal, and lithium. The addition of selenium into the metal-rich metal-chalcogenide material widens the optical absorption band-gap of the material, and significantly increases the visible-light transmittance of the thin-film material in its bleached state. Addition of other chalcogen elements (such as O and S) shows the same effect of optical band-gap widening. The optical band-gap of the thin-film material increases with the electronegativity of the constituent chalcogen elements in the order of O>S>Se>Te.

The subject matter disclosed herein is described in specific terms by several working examples in which a metal-rich metal-chalcogenide thin film formed from one or more metals, one or more chalcogens, and lithium was produced by co-sputtering in a multi-source magnetron sputtering apparatus. The thin film for each example was formed on a glass sheet substrate having a thickness of about 3 mm. The glass sheet substrate was degreased, washed, dried, placed in a vacuum apparatus, and then subjected to vacuum evacuation. The thin film deposition took place in a high vacuum chamber with a base pressure of about $3 \times 10^{-7}$ Torr in the plasma of argon at close to room temperature, except as otherwise stated. The freshly deposited thin film had a typical metallic gloss and was in a mirror state. It should be understood that the subject matter disclosed herein is not limited by the following several working examples.

Figure 2A:
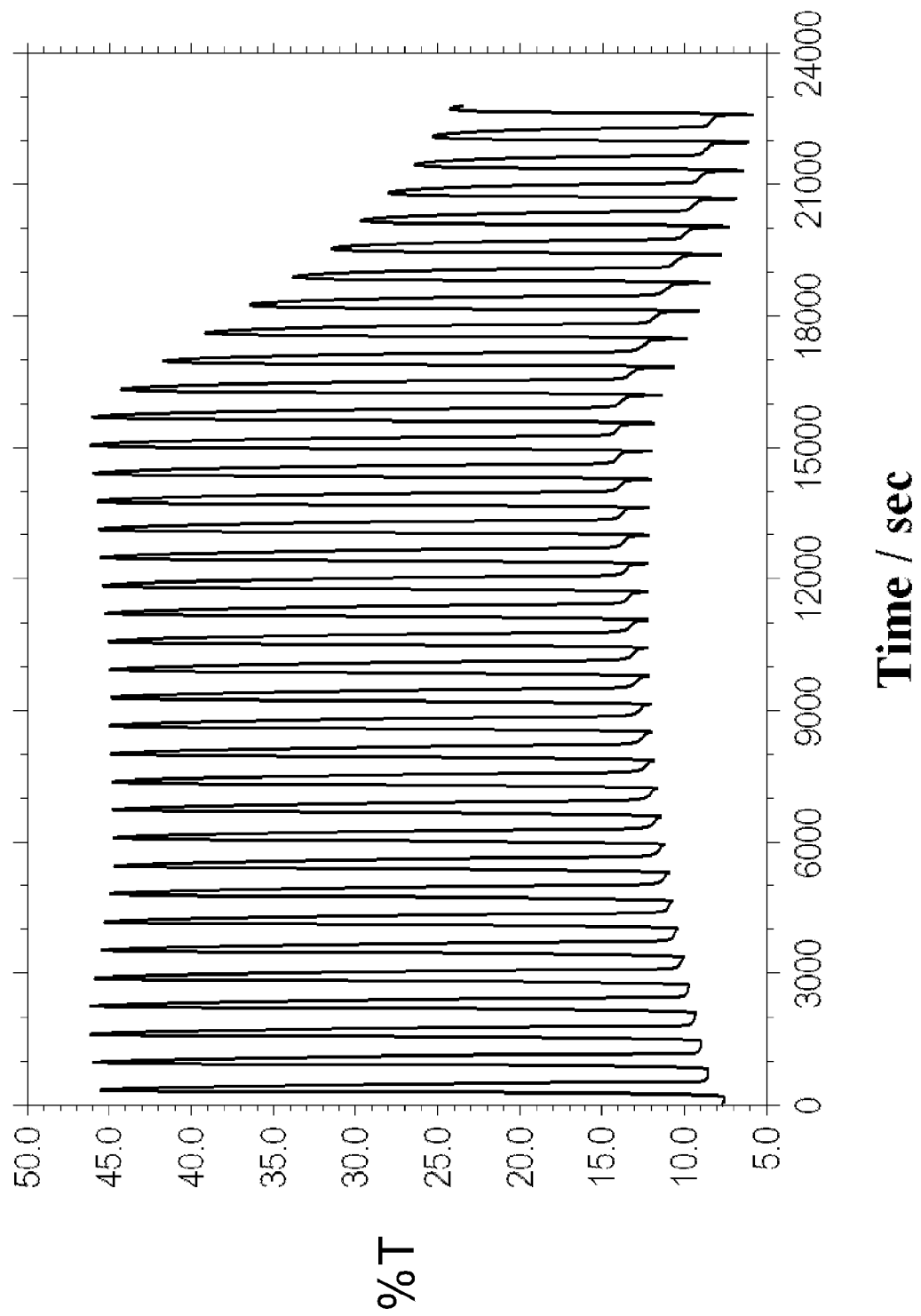
FIGS. 2A and 2B respectively depict the percentage transmittance and reflection signal characteristics for the 30-nm $Nb_3Te_2$ thin-film during wet cycling.
Figure 2B:
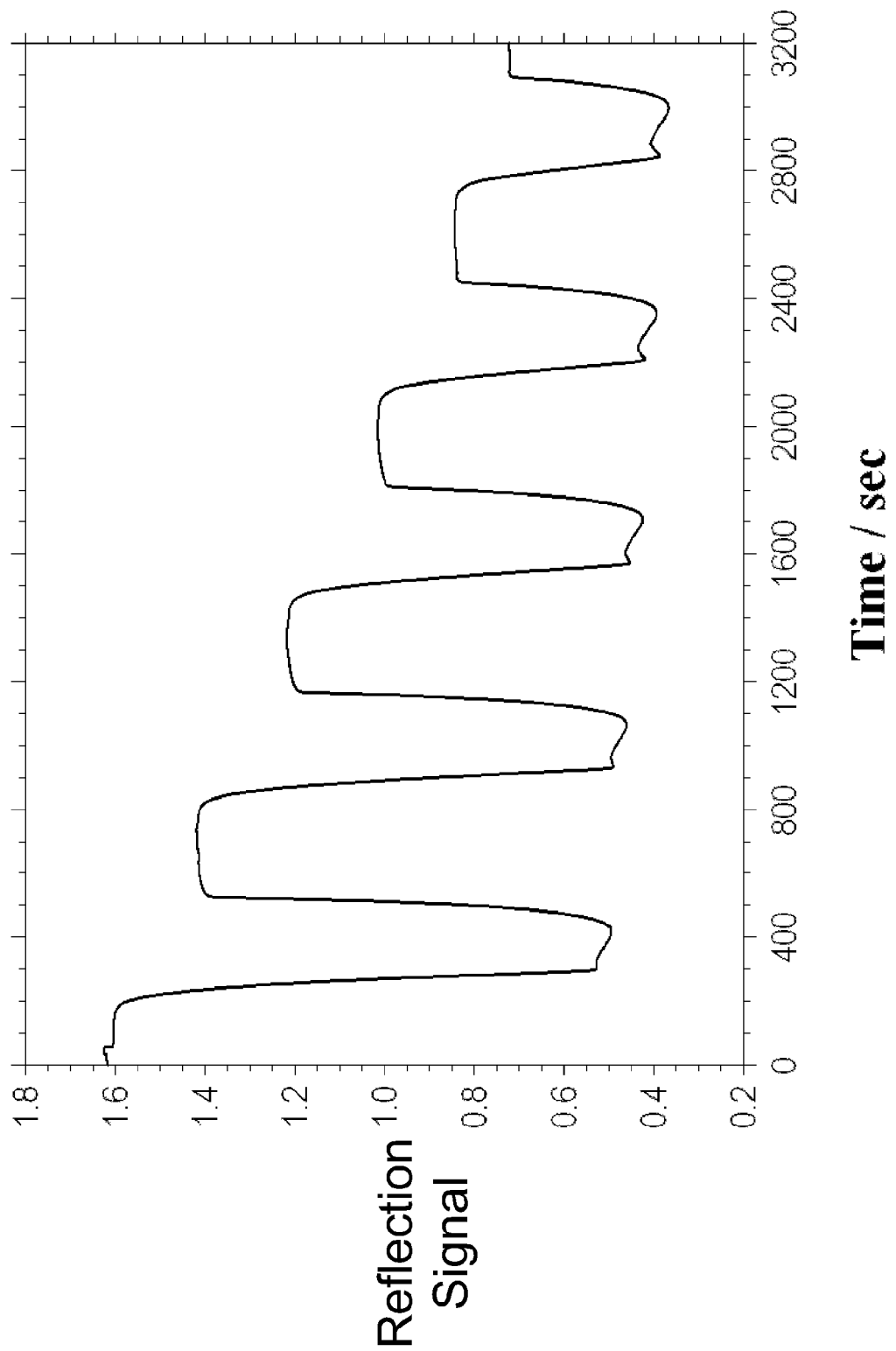

In one exemplary embodiment of the subject matter disclosed herein, a reflection-switchable thin-film material was formed by co-sputtering Te and Nb at close to room temperature to form a metal-rich metal-chalcogenide thin film having a composition of $Nb_3Te_2$. Depending upon the embodiment, the thickness of the thin film material formed can be between about 1 nm and about 500 nm. Curves 1 and 4 in FIG. 1 graphically depict UV-Vis-NIR transmittance and reflectance spectra for a 30-nm $Nb_3Te_2$ thin film deposited on an FTO-coated glass substrate. Selection of a particular thin-film material thickness is a tradeoff between a relatively thin film, which provides a generally higher transmittance, but a generally lower reflectance and durability, and a relatively thick film, which provides a generally lower transmittance, but a generally higher reflectance and better durability. The optical switching characteristics of the 30-nm $Nb_3Te_2$ thin film were evaluated by cycling it on a potentiostat in a three-electrode electrochemical cell at 5 mV/s between 1.0 V and 2.6 V vs. Li foil (Electrolyte: 1 M $LiClO_4$ in propylene carbonate). The transmittance and reflectance of the thin-film samples were simultaneously measured versus time during cycling using a Si photo-detector, which is sensitive to photons in the wavelength range of from about 400 nm to about 1100 nm. FIG. 2A graphically depicts a plot of percentage transmittance versus time for the 30-nm $Nb_3Te_2$ thin film during the wet cycling. FIG. 2B graphically depicts a plot of reflection-signal intensity versus time for the 30-nm $Nb_3Te_2$ thin film during the wet cycling. As depicted in FIGS. 2A and 2B, the 30-nm $Nb_3Te_2$ thin film shows a large and persistent optical switching in both transmission and reflection before degradation occurs after about 25 cycles.

Figure 3A:
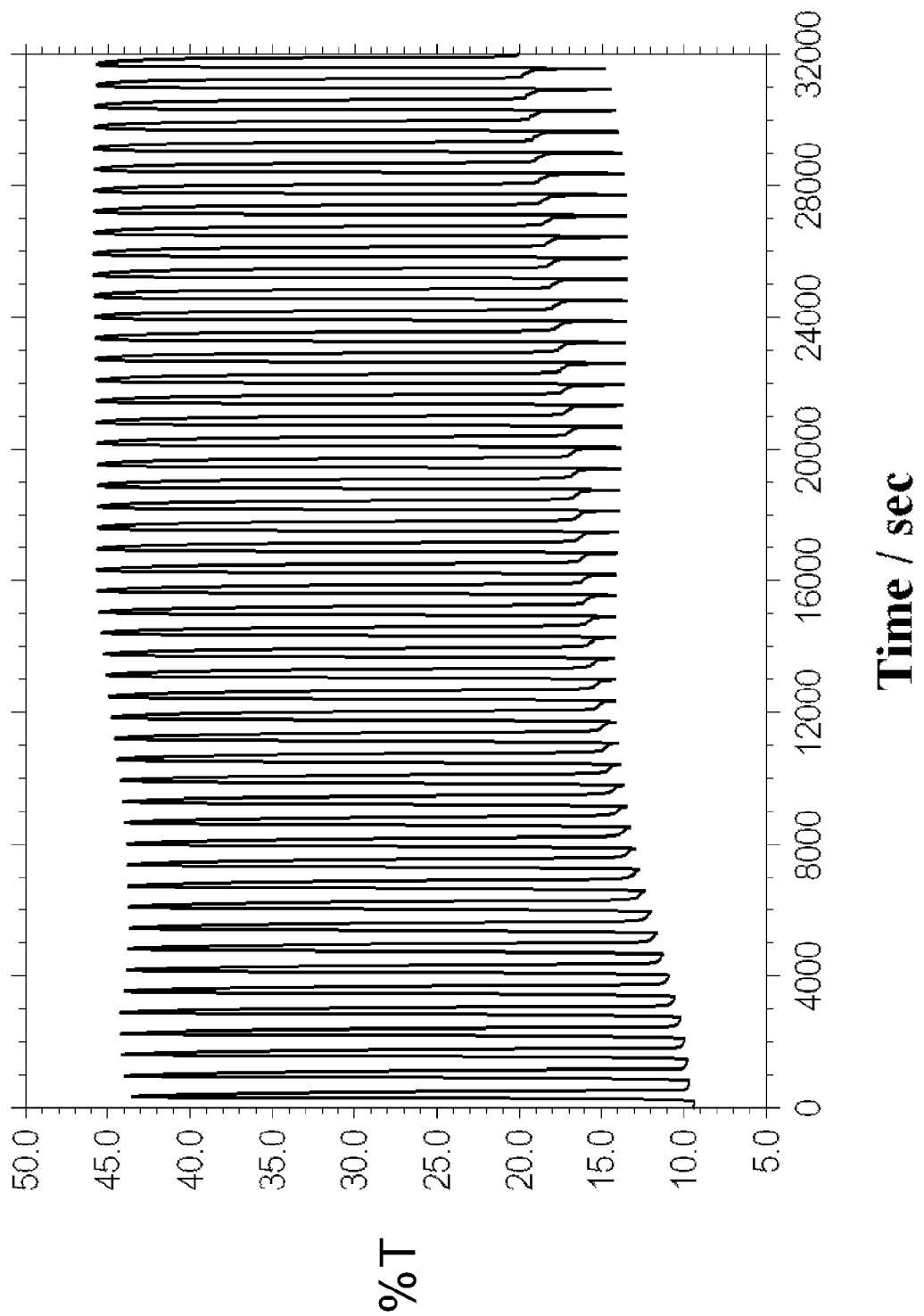
FIGS. 3A and 3B respectively depict the percentage transmittance and reflection signal characteristics for the 30-nm $Nb_3Te_2Li_{0.4}$ thin-film during wet cycling.
Figure 3B:
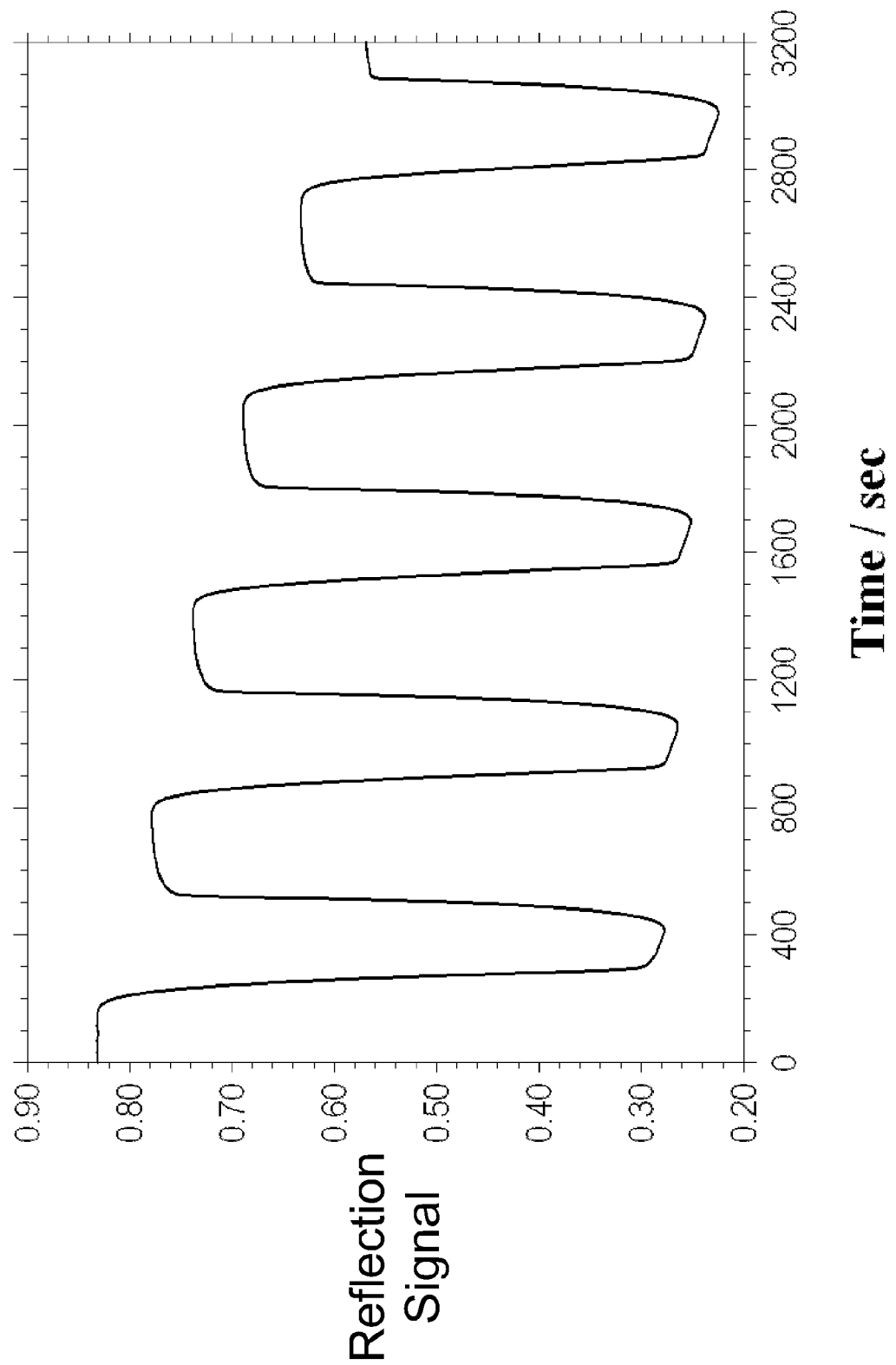

In one exemplary embodiment of the subject matter disclosed herein, a reflection-switchable thin-film material was formed by co-sputtering Te, Nb and Li at close to room temperature to form a lithiated metal-rich metal-chalcogenide thin film having a composition of $Nb_3Te_2Li_{0.4}$. Depending upon the embodiment, the thickness of the thin film material formed can be between about 1 nm and about 500 nm. Selection of a particular thin-film material thickness is a tradeoff between a relatively thin film, which provides a generally higher transmittance, but a generally lower reflectance and durability, and a relatively thick film, which provides a generally lower transmittance, but a generally higher reflectance and better durability. Curves 2 and 3 in FIG. 1 graphically depict UV-Vis-NIR transmittance and reflectance spectra for a 30-nm $Nb_3Te_2Li_{0.4}$ thin film deposited on an FTO-coated glass substrate. Compared to the lithium-free sample shown by curves 1 and 4 in FIG. 1, the lithium-containing sample shows slightly higher transmittance and slightly lower reflectance. The optical switching characteristics of the 30-nm $Nb_3Te_2Li_{0.4}$ thin film were evaluated by cycling it on a potentiostat in a three-electrode electrochemical cell at 5 mV/s between 1.0 V and 2.6 V vs. Li foil (Electrolyte: 1 M $LiClO_4$ in propylene carbonate). The transmittance and reflectance of the thin-film sample were simultaneously measured in-situ versus time during the wet cycling using a Si photo-detector, which is sensitive to photons in the wavelength range of from about 400 nm to about 1100 nm. FIG. 3A graphically depicts a plot of percentage transmittance versus time for the 30-nm $Nb_3Te_2Li_{0.4}$ thin film during the wet cycling. FIG. 3B graphically depicts a plot of reflection-signal intensity versus time for the 30-nm $Nb_3Te_2Li_{0.4}$ thin film during the wet cycling. Comparing the results depicted in FIGS. 3A and 3B with the results depicted in FIGS. 2A and 2B, one can see that the lithiated thin film shows a steadier optical switching in both transmission and reflection. It should be understood that other chalcogens and metals could be used to replace Te and Nb, respectively, which are used in this exemplary embodiment of a metal-rich metal-chalcogen thin-film material according to the subject matter disclosed herein.

Figure 4:
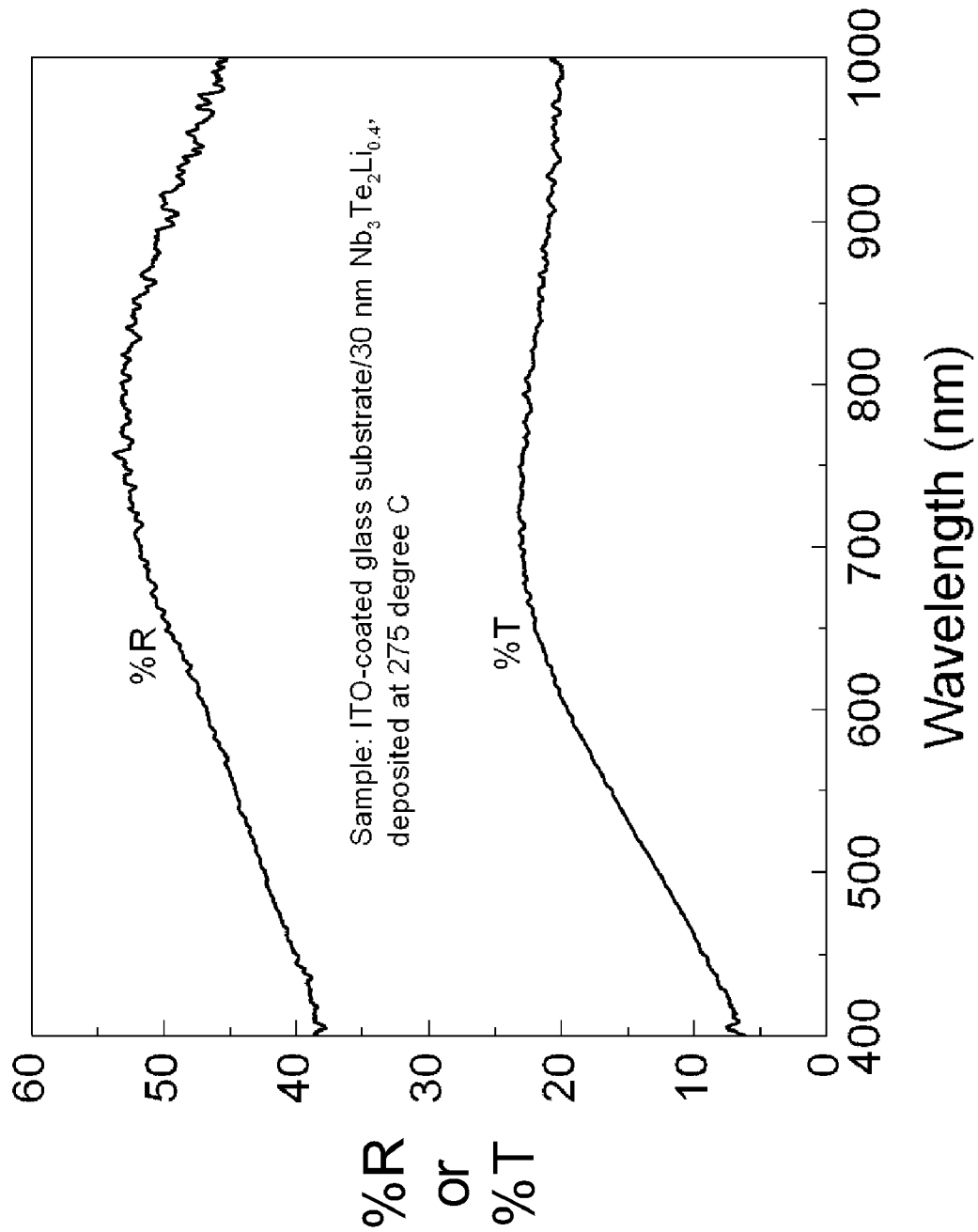
FIG. 4 graphically depicts UV-Vis-NIR transmittance and reflectance spectra for 30-nm $Nb_3Te_2Li_{0.4}$ thin film deposited at 275 degree Celsius on an ITO-coated glass substrate.
Figure 5A:
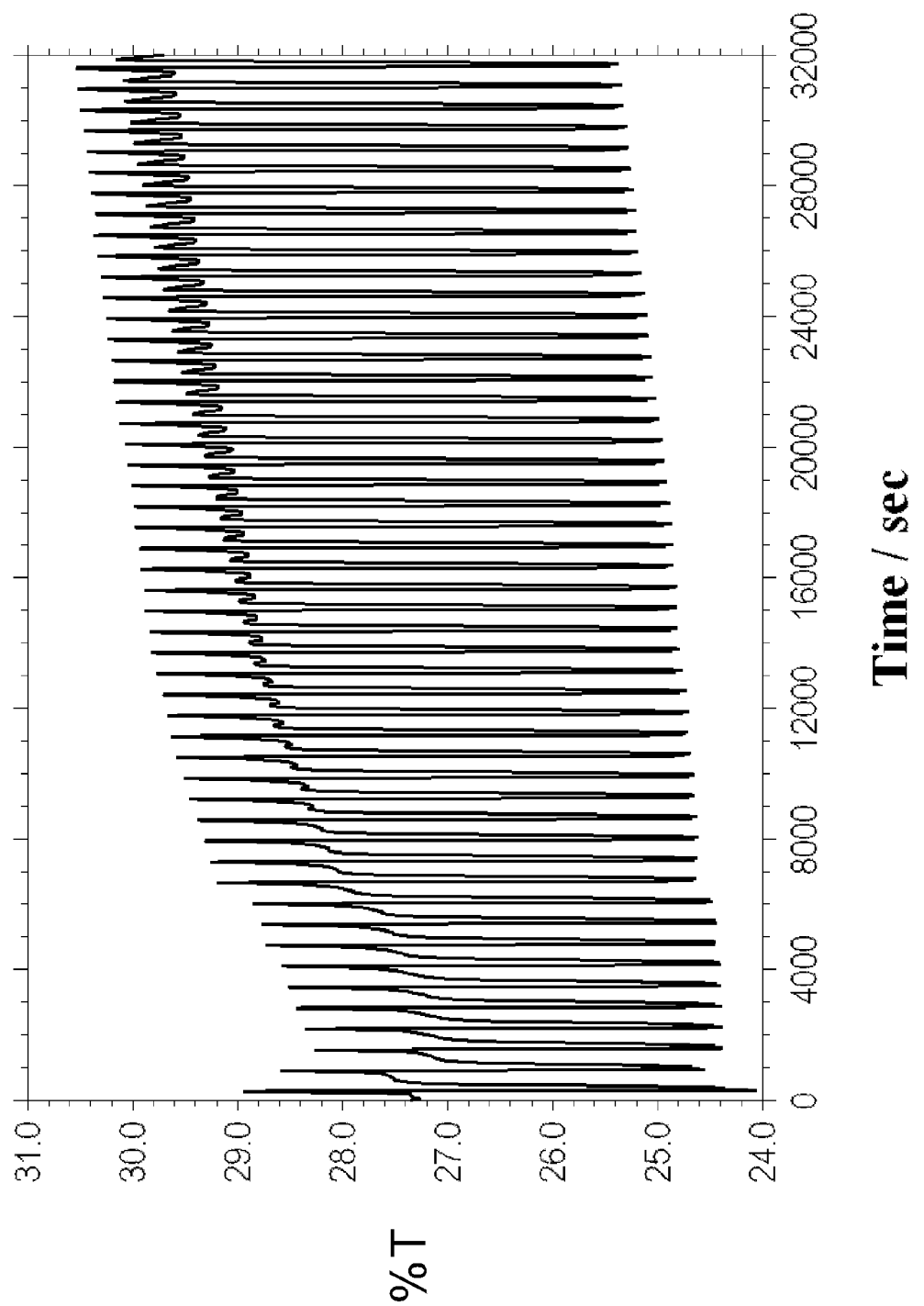
FIGS. 5A and 5B respectively depict the percentage transmittance and reflectance characteristics for the 30-nm $Nb_3Te_2Li_{0.4}$ thin-film deposited at 275 degree Celsius during wet cycling.
Figure 5B:
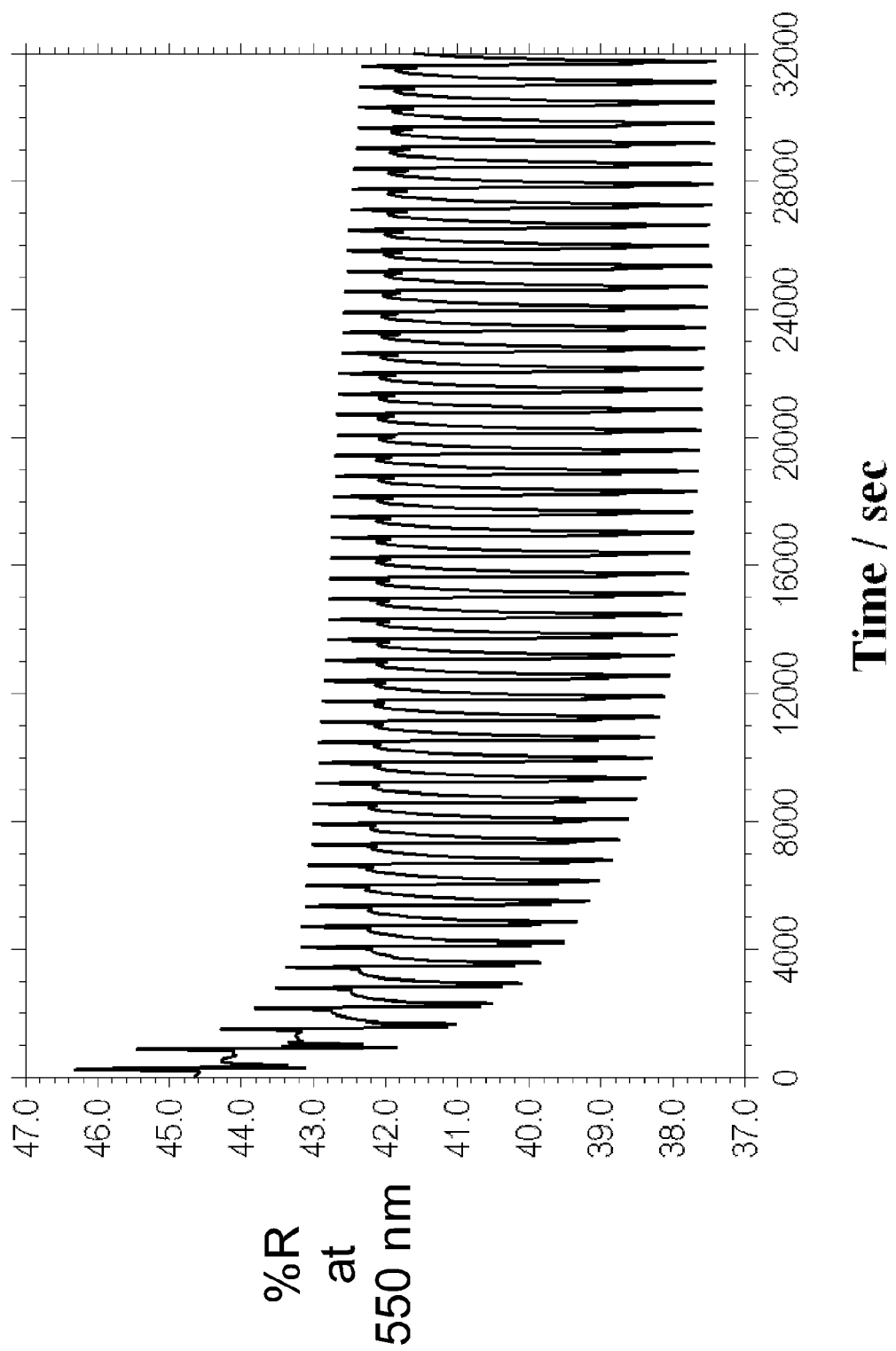

In one exemplary embodiment of the subject matter disclosed herein, a reflection-switchable thin-film material was formed by co-sputtering Te, Nb and Li onto an ITO-coated glass substrate heated at about 275 degree Celsius to form a metal-rich metal-chalcogenide thin film having a composition of $Nb_3Te_2Li_{0.4}$. Depending upon the embodiment, the thickness of the thin film material formed can be between about 1 nm and about 500 nm. Selection of a particular thin-film material thickness is a tradeoff between a relatively thin film, which provides a generally higher transmittance, but a generally lower reflectance and durability, and a relatively thick film, which provides a generally lower transmittance, but a generally higher reflectance and better durability. FIG. 4 graphically depicts UV-Vis-NIR transmittance and reflectance spectra for a 30-nm $Nb_3Te_2Li_{0.4}$ thin film deposited at about 275 degree Celsius on an ITO-coated glass substrate. Compared to the samples deposited at close to room temperature as depicted in FIG. 1, the sample deposited at an elevated temperature shows higher transmittance in its as-deposited state. The optical switching characteristics of the 30-nm $Nb_3Te_2Li_{0.4}$ thin film deposited at 275 degree Celsius was evaluated by cycling it on a potentiostat in a three-electrode electrochemical cell at 5 mV/s between 1.0 V and 2.6 V vs. Li foil (Electrolyte: 1 M $LiClO_4$ in propylene carbonate). The transmittance and reflectance of the thin-film sample were simultaneously measured in-situ versus time during the wet cycling using a Si photo-detector, which is sensitive to photons in the wavelength range of from about 400 nm to about 1100 nm. FIG. 5A graphically depicts a plot of percentage transmittance versus time for the 30-nm $Nb_3Te_2Li_{0.4}$ thin film deposited at 275 degree Celsius during the wet cycling. FIG. 5B graphically depicts a plot of percentage reflectance versus time for the 30-nm $Nb_3Te_2Li_{0.4}$ thin film deposited at 275 degree Celsius during the wet cycling. Comparing the results depicted in FIGS. 5A and 5B with the results depicted in FIGS. 3A and 3B, it can be seen that the thin film deposited at an elevated temperature shows narrower optical switching ranges in both transmission and reflection, but shows much better durability for extended cycling. It should be understood that other chalcogens and metals could be used to replace Te and Nb, respectively, which are used in this exemplary embodiment of a metal-rich metal-chalcogen thin-film material according to the subject matter disclosed herein.

Figure 6:
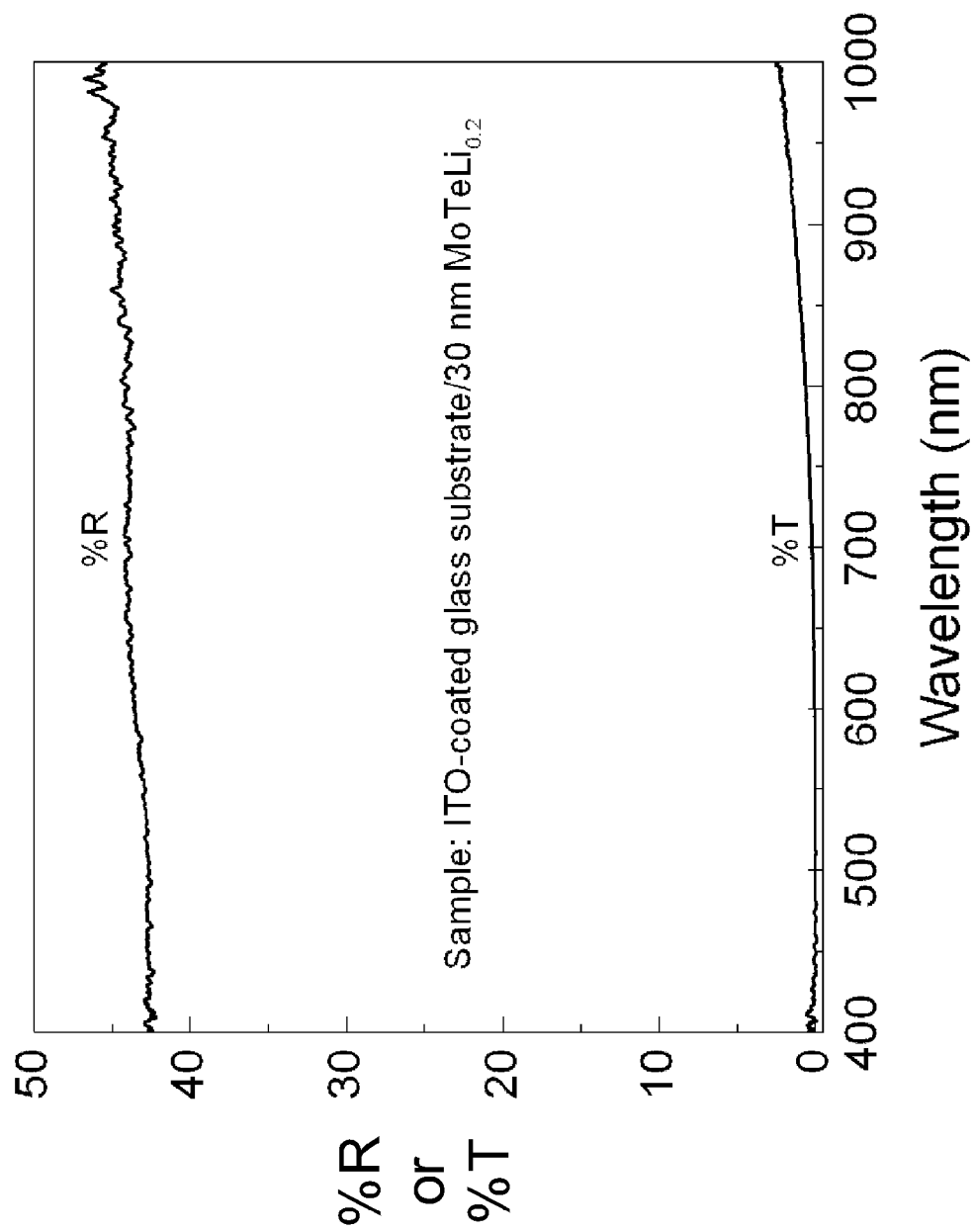
FIG. 6 graphically depicts UV-Vis-NIR transmittance and reflectance spectra for 30-nm $MoTeLi_{0.2}$ thin film deposited on an ITO-coated glass substrate.
Figure 7A:
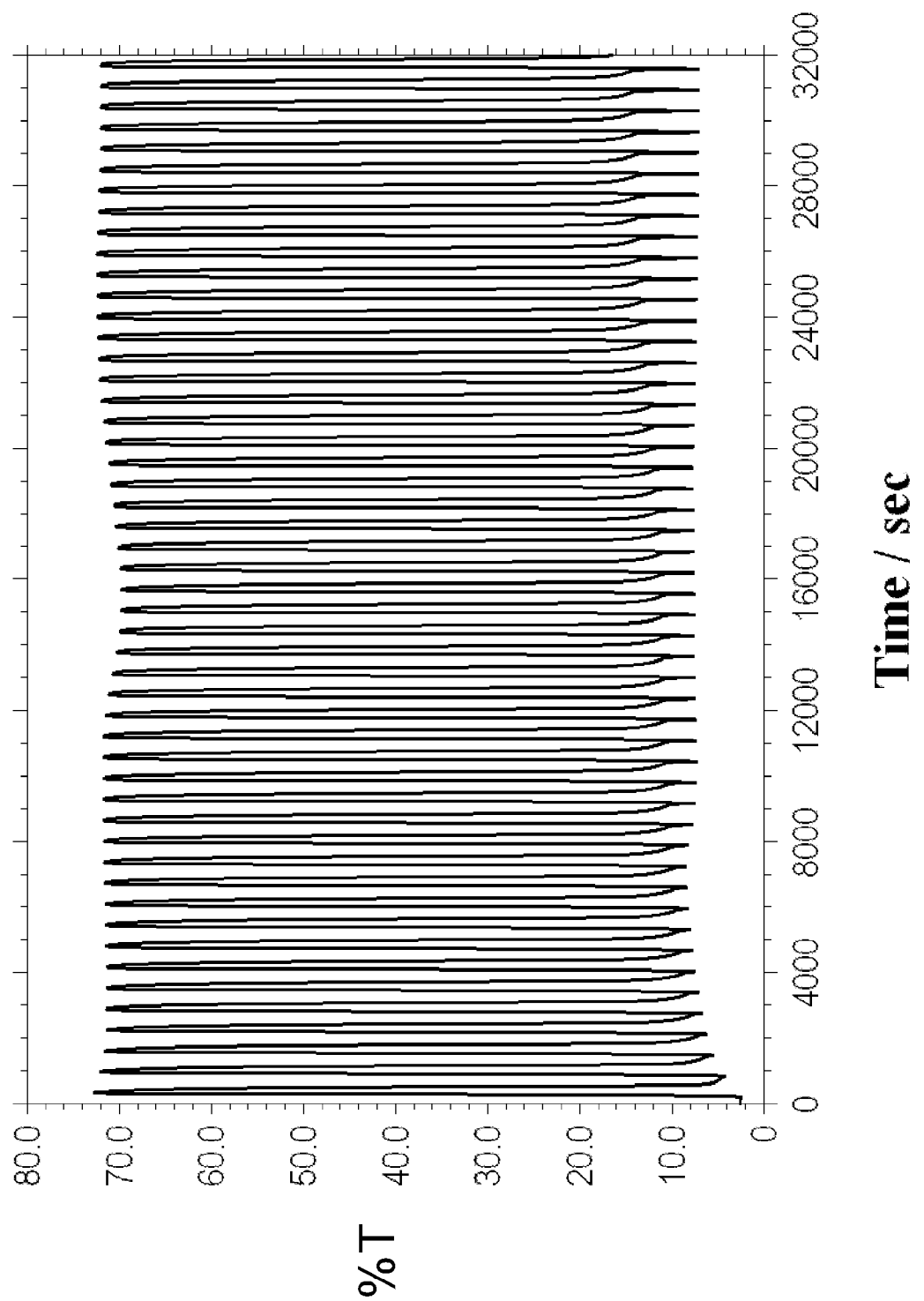
FIGS. 7A and 7B respectively depict the percentage transmittance and reflectance characteristics for the 30-nm $MoTeLi_{0.2}$ thin-film during wet cycling.
Figure 7B:
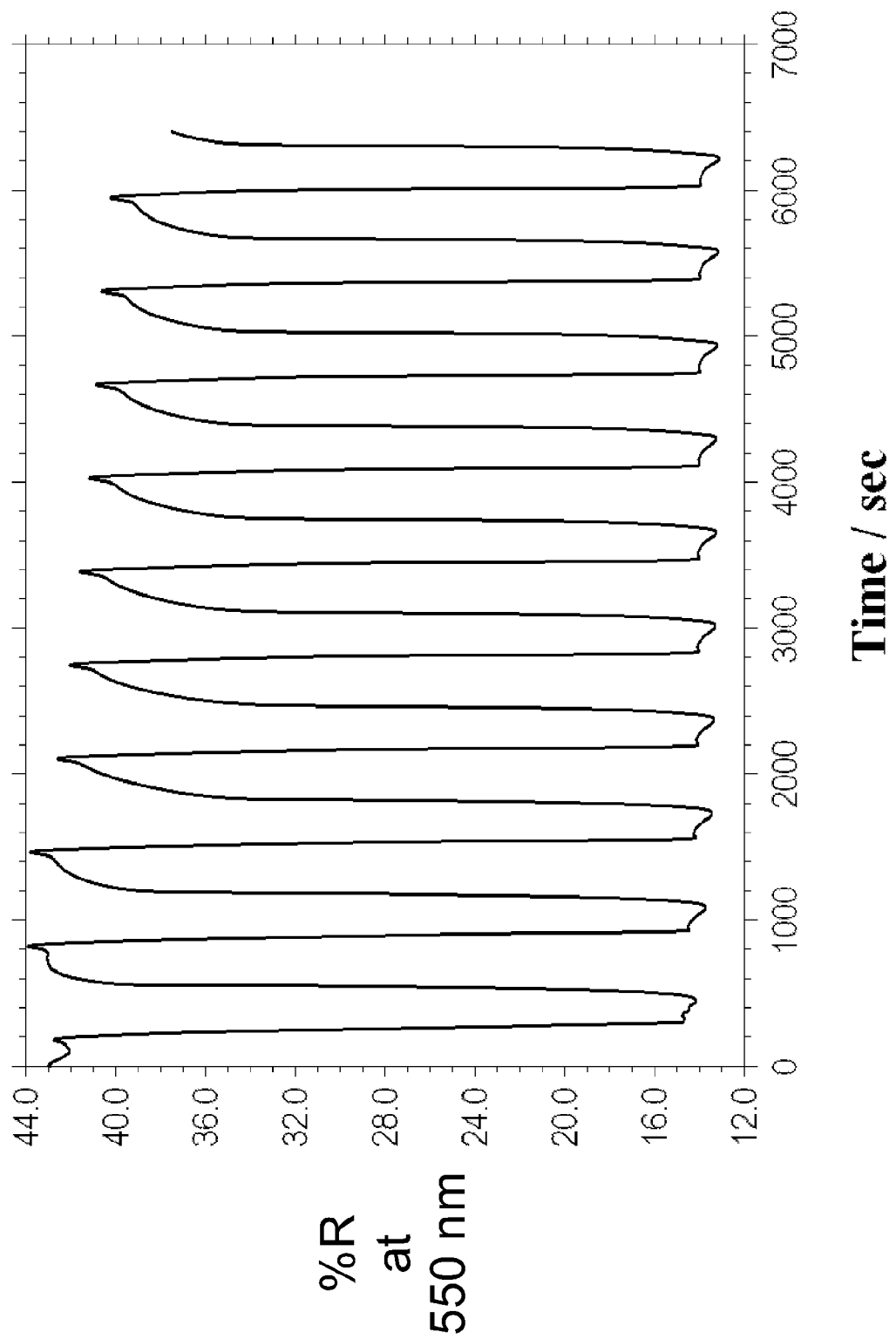
Figure 8:
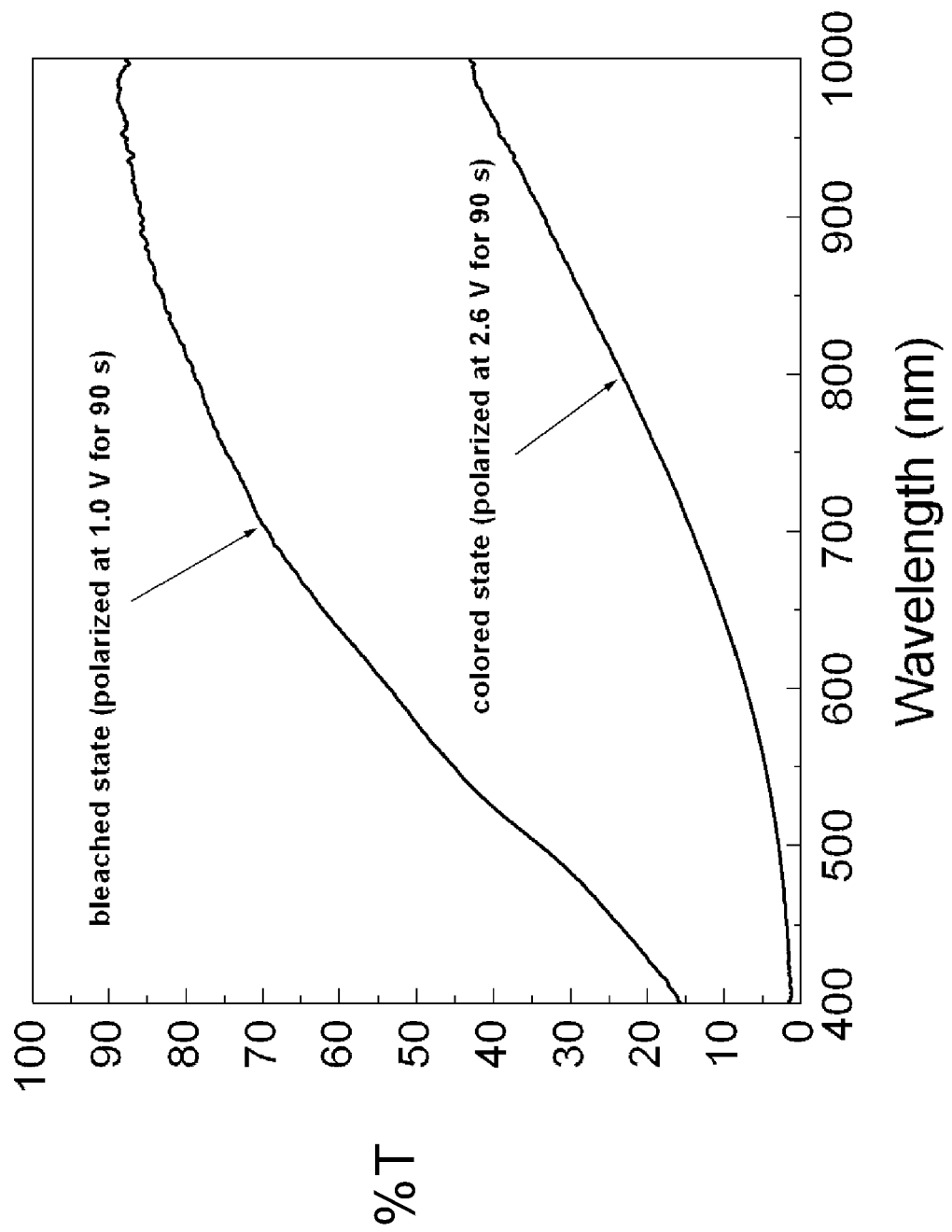
FIG. 8 graphically depicts UV-Vis-NIR transmittance spectra for the 30-nm $MoTeLi_{0.2}$ thin film at its colored and bleached states.

In one exemplary embodiment of the subject matter disclosed herein, a reflection-switchable thin-film material was formed by co-sputtering Te with Mo and Li at close to room temperature to form a metal-rich metal-chalcogenide thin film having a composition of $MoTeLi_{0.2}$. Depending upon the embodiment, the thickness of the thin film material formed can be between about 1 nm and about 500 nm. FIG. 6 graphically depicts UV-Vis-NIR transmittance and reflectance spectra for a 30-nm $MoTeLi_{0.2}$ thin film deposited on an ITO-coated glass substrate. Selection of a particular thin-film material thickness is a tradeoff between a relatively thin film, which provides a generally higher transmittance, but a generally lower reflectance and durability, and a relatively thick film, which provides a generally lower transmittance, but a generally higher reflectance and better durability. The optical switching characteristics of the 30-nm $MoTeLi_{0.2}$ thin film were evaluated by cycling it on a potentiostat in a three-electrode electrochemical cell at 5 mV/s between 1.0 V and 2.6 V vs. Li foil (Electrolyte: 1 M $LiClO_4$ in propylene carbonate). The transmittance and reflectance of the thin-film sample were simultaneously measured in-situ versus time during the wet cycling using a Si photo-detector, which is sensitive to photons in the wavelength range of from about 400 nm to about 1100 nm. FIGS. 7A and 7B respectively depict plots of percentage transmittance and reflectance versus time for the $MoTeLi_{0.2}$ thin film during the wet cycling. The transmittance of the thin film switches between about 5% and about 70%. Simultaneously, the reflectance of the thin film at the wavelength of 550 nm switches between about 45% and about 15%. The thin film shows excellent cyclibility with negligible degradations seen after at least about one hundred cycles. The spectral switching behaviors of the $MoTeLi_{0.2}$ thin film was measured using an Ocean Optics spectrophotometer. The thin film was polarized at +1.0 V and 2.6 V vs. Li for 90 seconds before recording the UV-vis-NIR transmittance spectra at its bleached and colored states, respectively, as recorded in FIG. 8. The thin film changes its transmittance at the wavelength of about 550 nm between about 5.0% and about 45% within 90 seconds, thus demonstrating a large range and a fast kinetics for its optical switching. It should be understood that other chalcogens and metals could be used to replace Te and Mo, respectively, which are used in this exemplary embodiment of a metal-rich metal-chalcogen thin-film material according to the subject matter disclosed herein.

Figure 9:
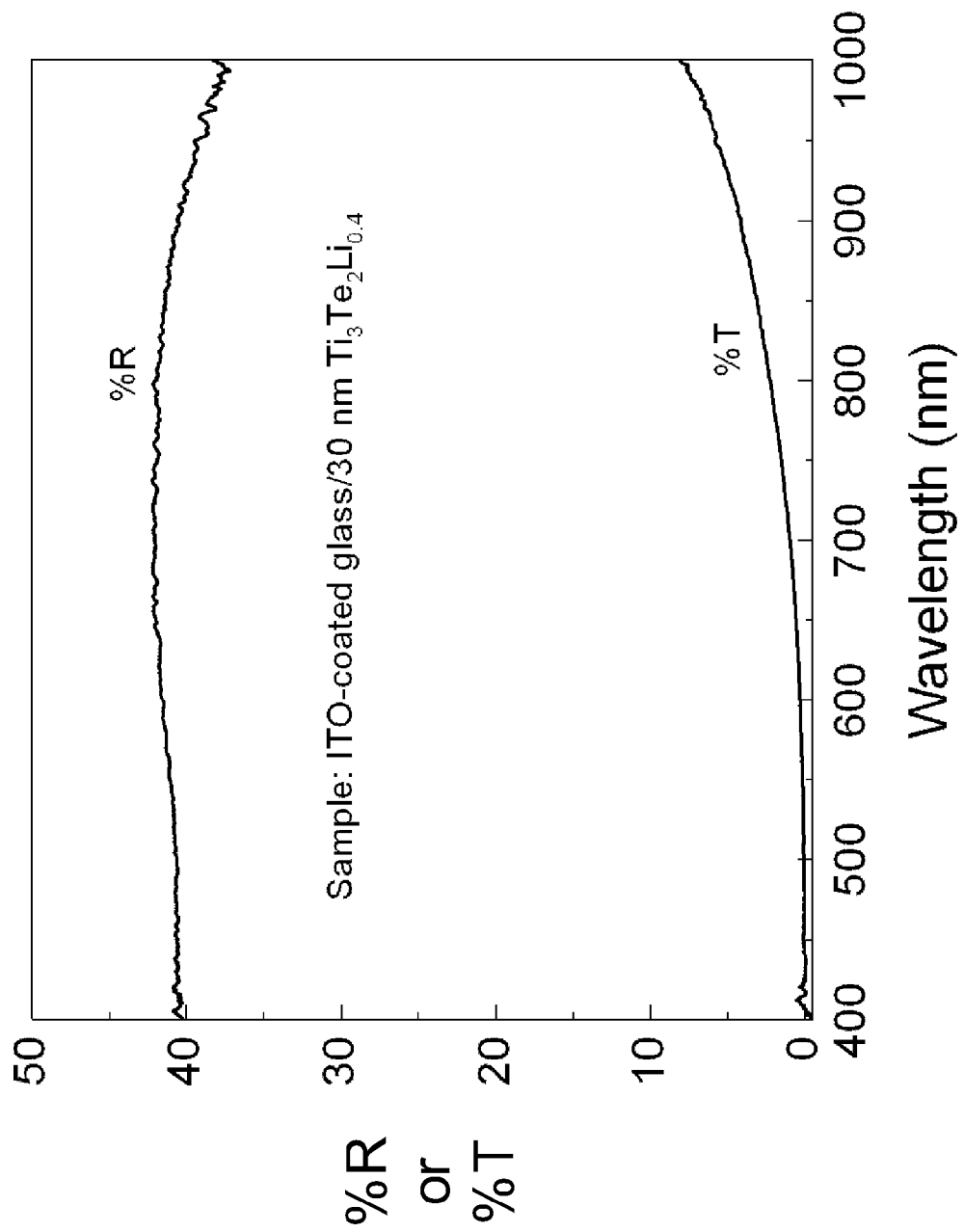
FIG. 9 graphically depicts UV-Vis-NIR transmittance and reflectance spectra for 30-nm $Ti_3Te_2Li_{0.4}$ thin film deposited on an ITO-coated glass substrate.
Figure 10A:
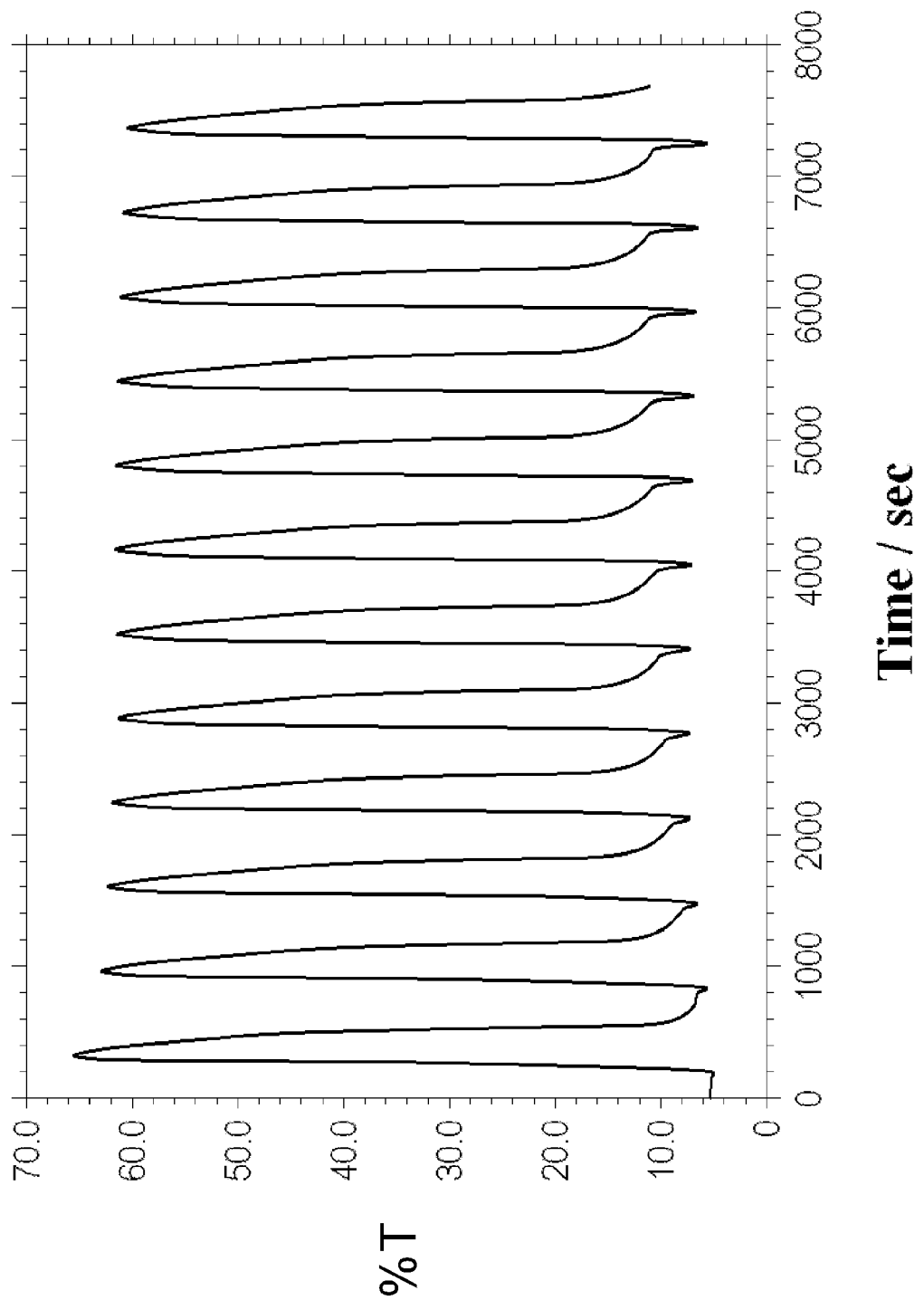
FIGS. 10A and 10B respectively depict the percentage transmittance and reflection signal characteristics for the 30-nm $Ti_3Te_2Li_{0.4}$ thin-film during wet cycling.
Figure 10B:
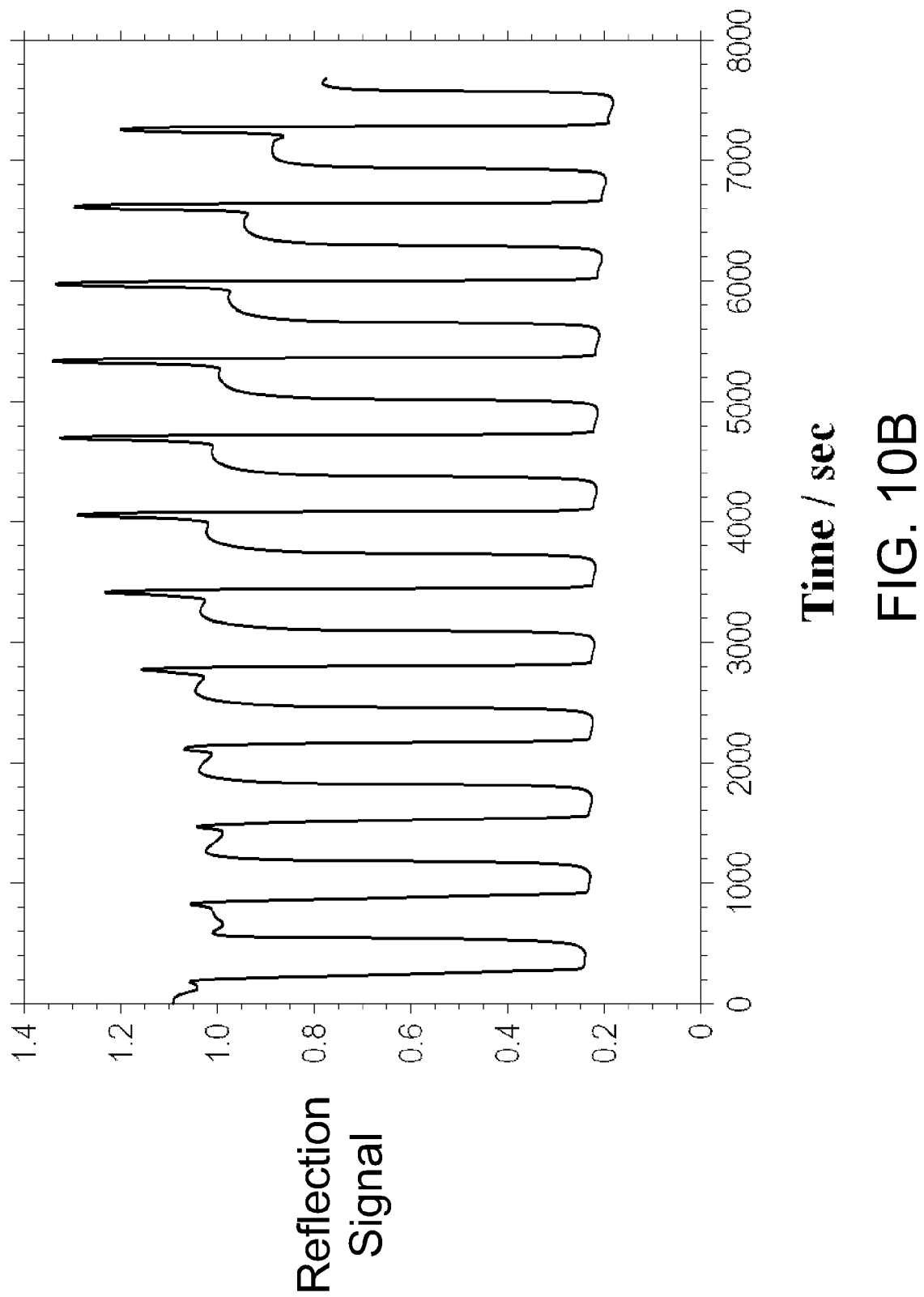

In one exemplary embodiment of the subject matter disclosed herein, a reflection-switchable thin-film material was formed by co-sputtering Te with Ti and Li at close to room temperature to form a metal-rich metal-chalcogenide thin film having a composition of $Ti_3Te_2Li_{0.4}$. Depending upon the embodiment, the thickness of the thin film material formed can be between about 1 nm and about 500 nm. FIG. 9 graphically depicts UV-Vis-NIR transmittance and reflectance spectra for a 30-nm $Ti_3Te_2Li_{0.4}$ thin film deposited on an ITO-coated glass substrate. Selection of a particular thin-film material thickness is a tradeoff between a relatively thin film, which provides a generally higher transmittance, but a generally lower reflectance and durability, and a relatively thick film, which provides a generally lower transmittance, but a generally higher reflectance and better durability. The optical switching characteristics of the 30-nm $Ti_3Te_2Li_{0.4}$ thin film were evaluated by cycling it on a potentiostat in a conventional three-electrode electrochemical cell at 5 mV/s between 1.0 V and 2.6 V vs. Li foil (Electrolyte: 1 M $LiClO_4$ in propylene carbonate). The transmittance and reflectance of the thin-film sample were simultaneously measured in-situ versus time during the wet cycling using a Si photo-detector, which is sensitive to photons in the wavelength range of from about 400 nm to about 1100 nm. FIGS. 10A and 10B respectively depict plots of percentage transmittance and reflection-signal intensity versus time for the $Ti_3Te_2Li_{0.4}$ thin film during the wet cycling. The transmittance of the thin film switches between about 8% and about 60%. The thin film shows excellent cyclibility with negligible degradations seen after at least about 50 cycles. It should be understood that other chalcogens and metals could be used to replace Te and Ti, respectively, which are used in this exemplary embodiment of a metal-rich metal-chalcogen thin-film material according to the subject matter disclosed herein.

Figure 11:
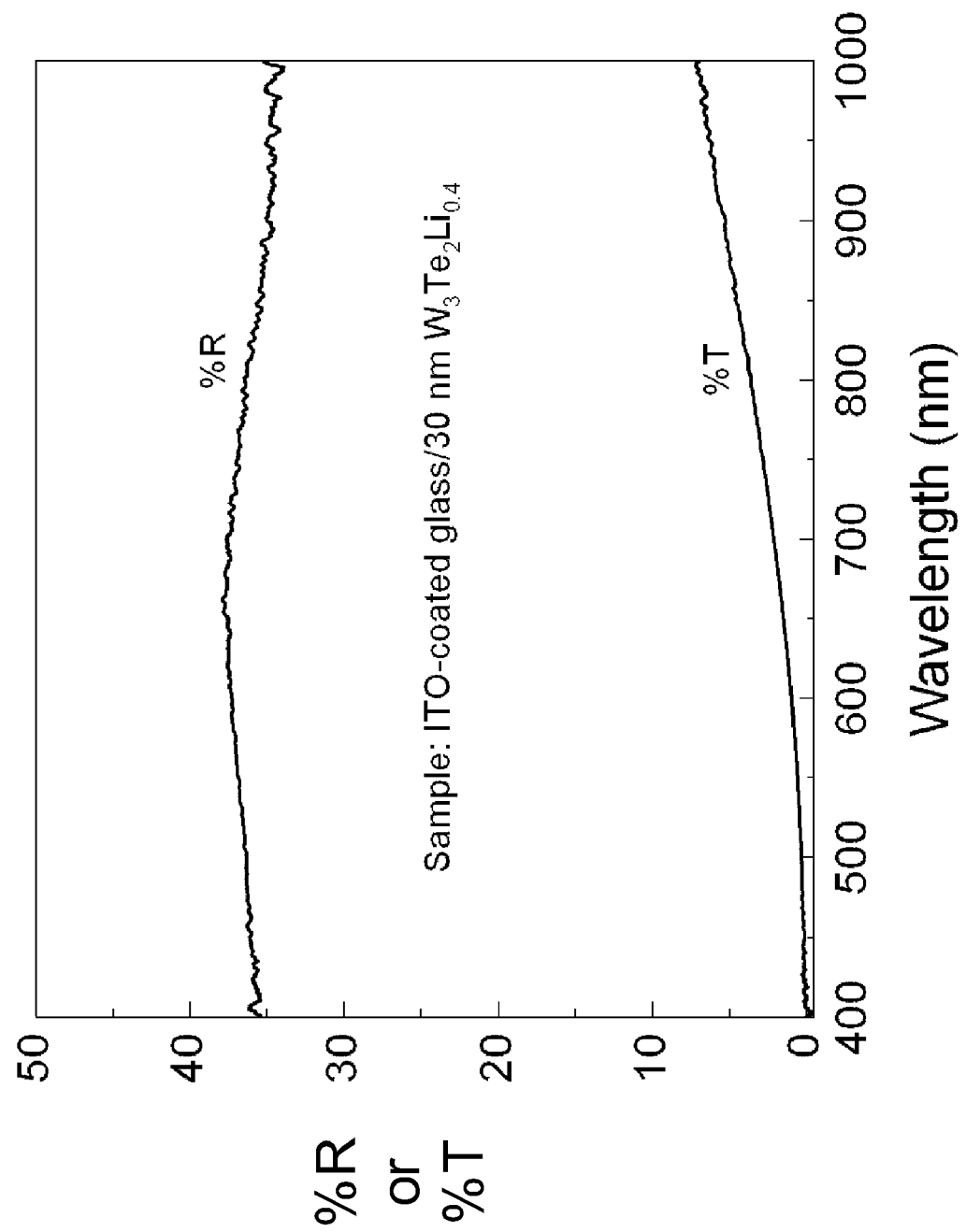
FIG. 11 graphically depicts UV-Vis-NIR transmittance and reflectance spectra for 30-nm $W_3Te_2Li_{0.4}$ thin film deposited on an ITO-coated glass substrate.
Figure 12A:
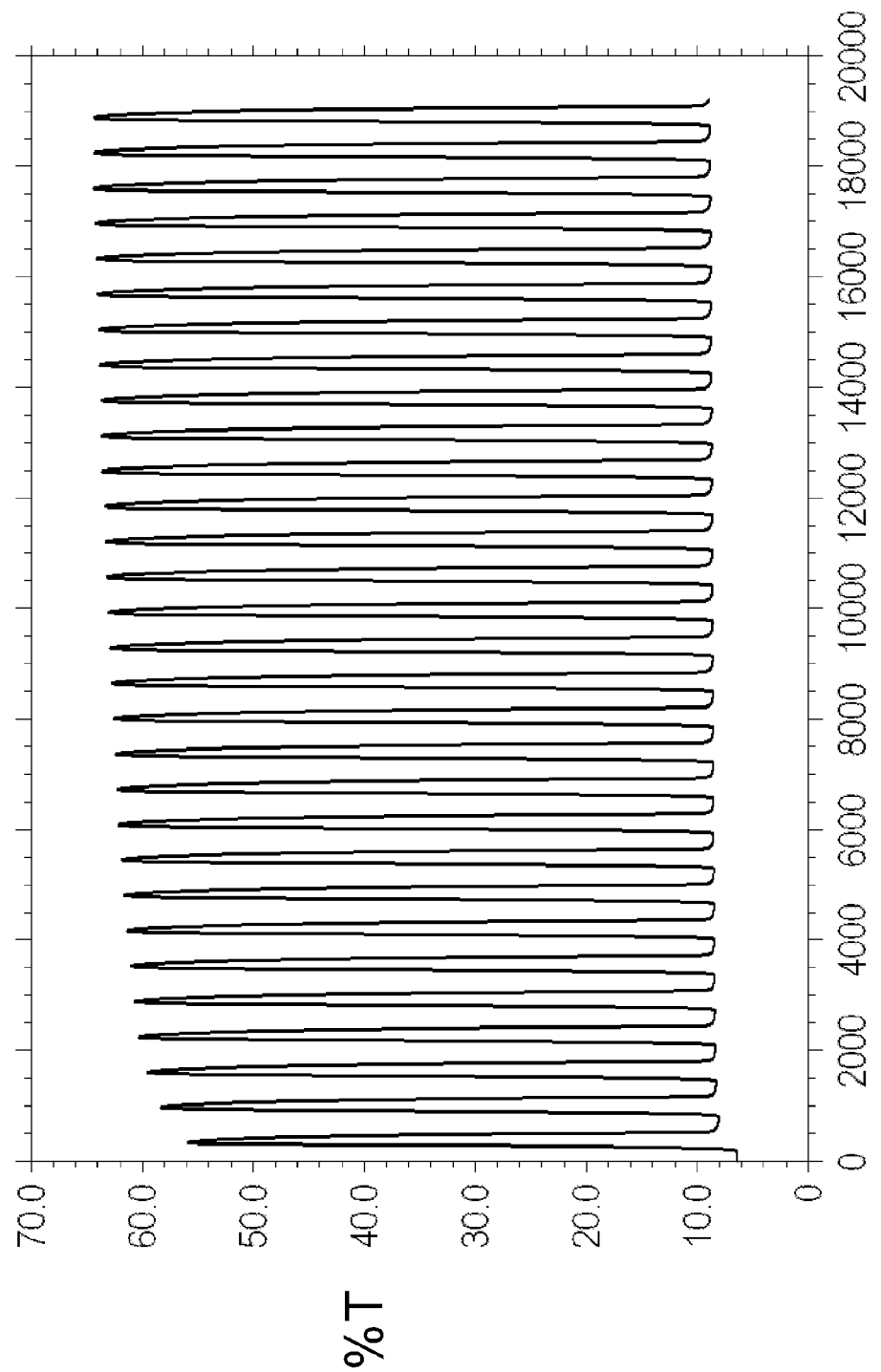
FIGS. 12A and 12B respectively depict the percentage transmittance and reflectance characteristics for the 30-nm $W_3Te_2Li_{0.4}$ thin-film during wet cycling.
Figure 12B:
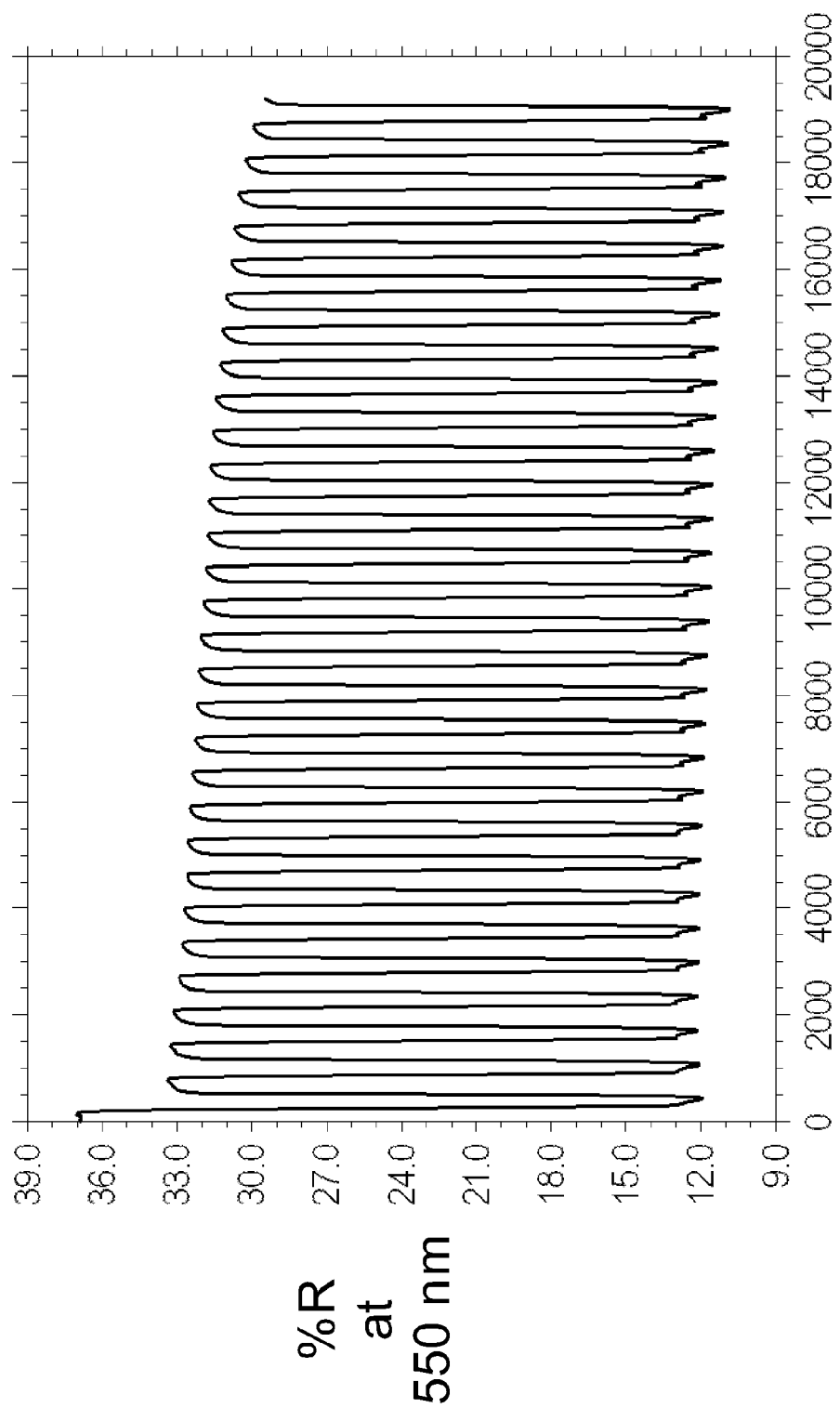
Figure 13:
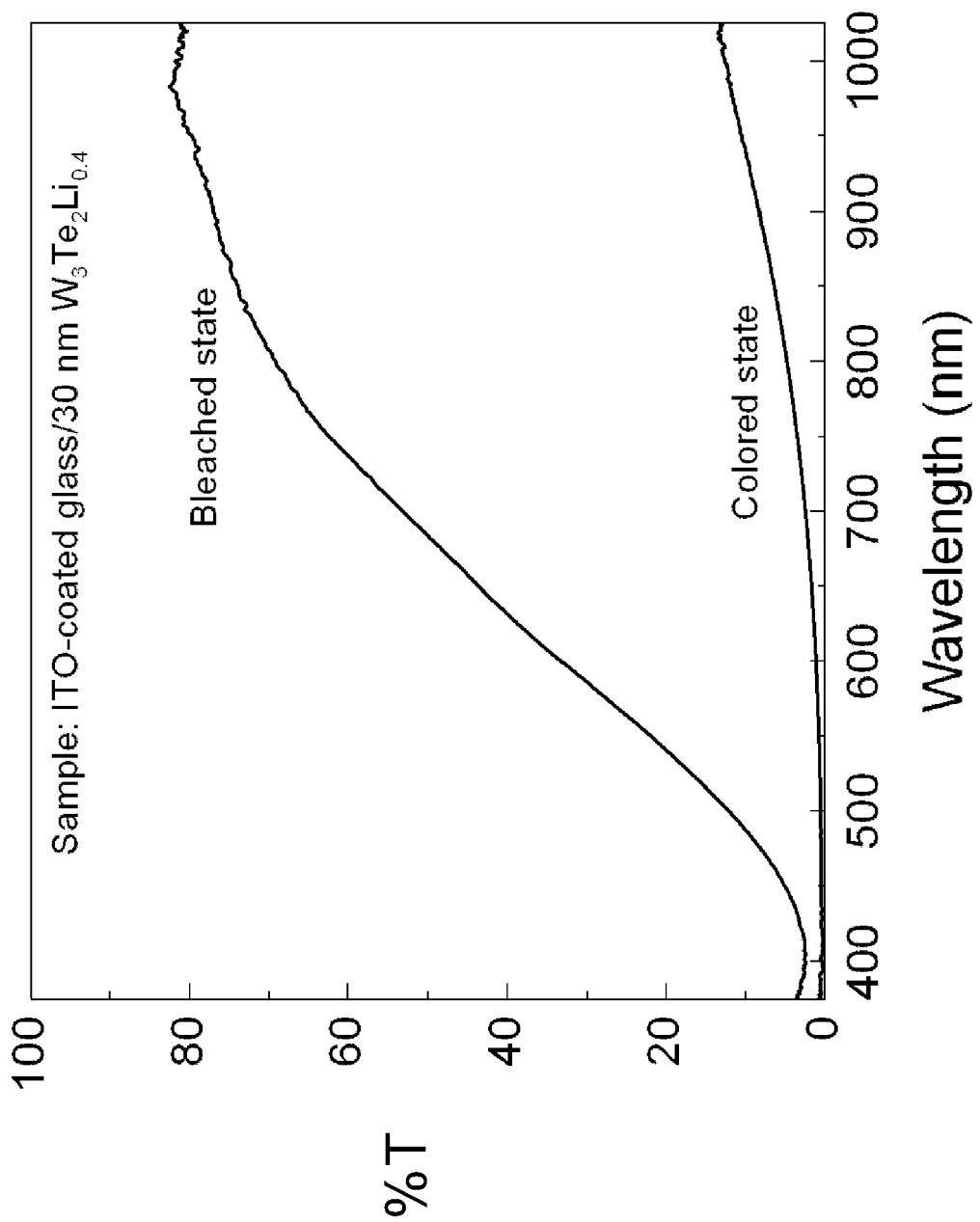
FIG. 13 graphically depicts UV-Vis-NIR transmittance spectra for the 30-nm $W_3Te_2Li_{0.4}$ thin film at its colored and bleached states.

In one exemplary embodiment of the subject matter disclosed herein, a reflection-switchable thin-film material was formed by co-sputtering Te with W and Li at close to room temperature to form a metal-rich metal-chalcogenide thin film having a composition of $W_3Te_2Li_{0.4}$. Depending upon the embodiment, the thickness of the thin film material formed can be between about 1 nm and about 500 nm. FIG. 11 graphically depicts UV-Vis-NIR transmittance and reflectance spectra for a 30-nm $W_3Te_2Li_{0.4}$ thin film deposited on an ITO-coated glass substrate. Selection of a particular thin-film material thickness is a tradeoff between a relatively thin film, which provides a generally higher transmittance, but a generally lower reflectance and durability, and a relatively thick film, which provides a generally lower transmittance, but a generally higher reflectance and better durability. The optical switching characteristics of the 30-nm $W_3Te_2Li_{0.4}$ thin film were evaluated by cycling it on a potentiostat in a three-electrode electrochemical cell at 5 mV/s between 1.0 V and 2.6 V vs. Li foil (Electrolyte: 1 M $LiClO_4$ in propylene carbonate). The transmittance and reflectance of the thin-film sample were simultaneously measured in-situ versus time during the wet cycling using a Si photo-detector, which is sensitive to photons in the wavelength range of from about 400 nm to about 1100 nm. FIGS. 12A and 12B respectively depict plots of percentage transmittance and reflectance versus time for the $W_3Te_2Li_{0.4}$ thin film during the wet cycling. The transmittance of the thin film switches between about 8% and about 60%. Simultaneously, the reflectance of the thin film at the wavelength of 550 nm switches between about 32% and about 12%. The thin film shows excellent cyclibility with negligible degradations seen after at least about one hundred cycles. The spectral switching behaviors of the $W_3Te_2Li_{0.4}$ thin film was measured using an Ocean Optics spectrophotometer. The thin film was polarized at +1.0 V and 2.6 V vs. Li for 90 seconds before recording the UV-vis-NIR transmittance spectra at its bleached and colored states, respectively, as depicted in FIG. 13. The thin film changes its transmittance at the wavelength of about 550 nm between about 0.8% and about 22% within 90 seconds, thus demonstrating a large range and a fast kinetics for its optical switching. It should be understood that other chalcogens and metals could be used to replace Te and W, respectively, which are used in this exemplary embodiment of a metal-rich metal-chalcogen thin-film material according to the subject matter disclosed herein.

Figure 14:
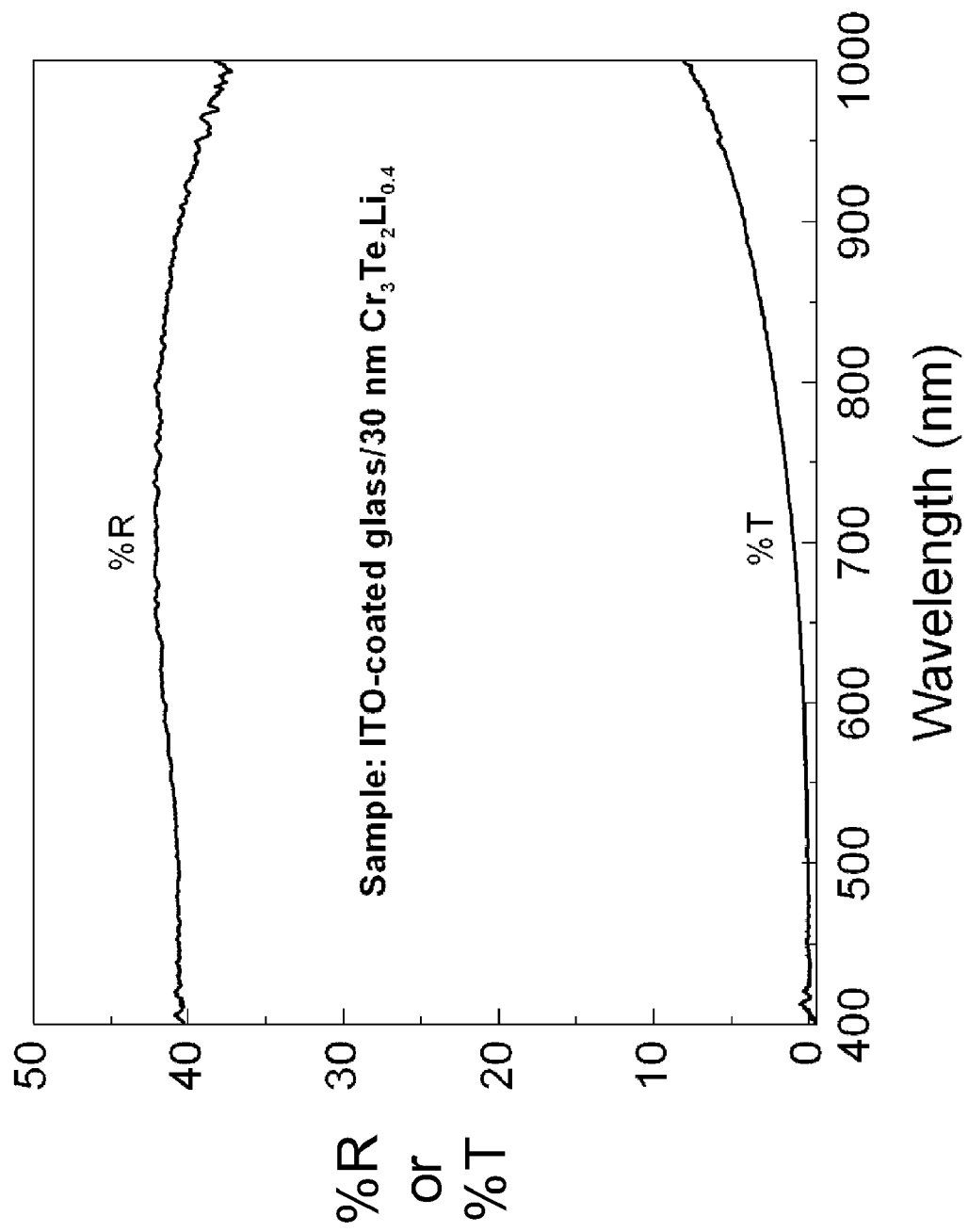
FIG. 14 graphically depicts UV-Vis-NIR transmittance and reflectance spectra for 30-nm $Cr_3Te_2Li_{0.4}$ thin film deposited on an ITO-coated glass substrate.
Figure 15A:
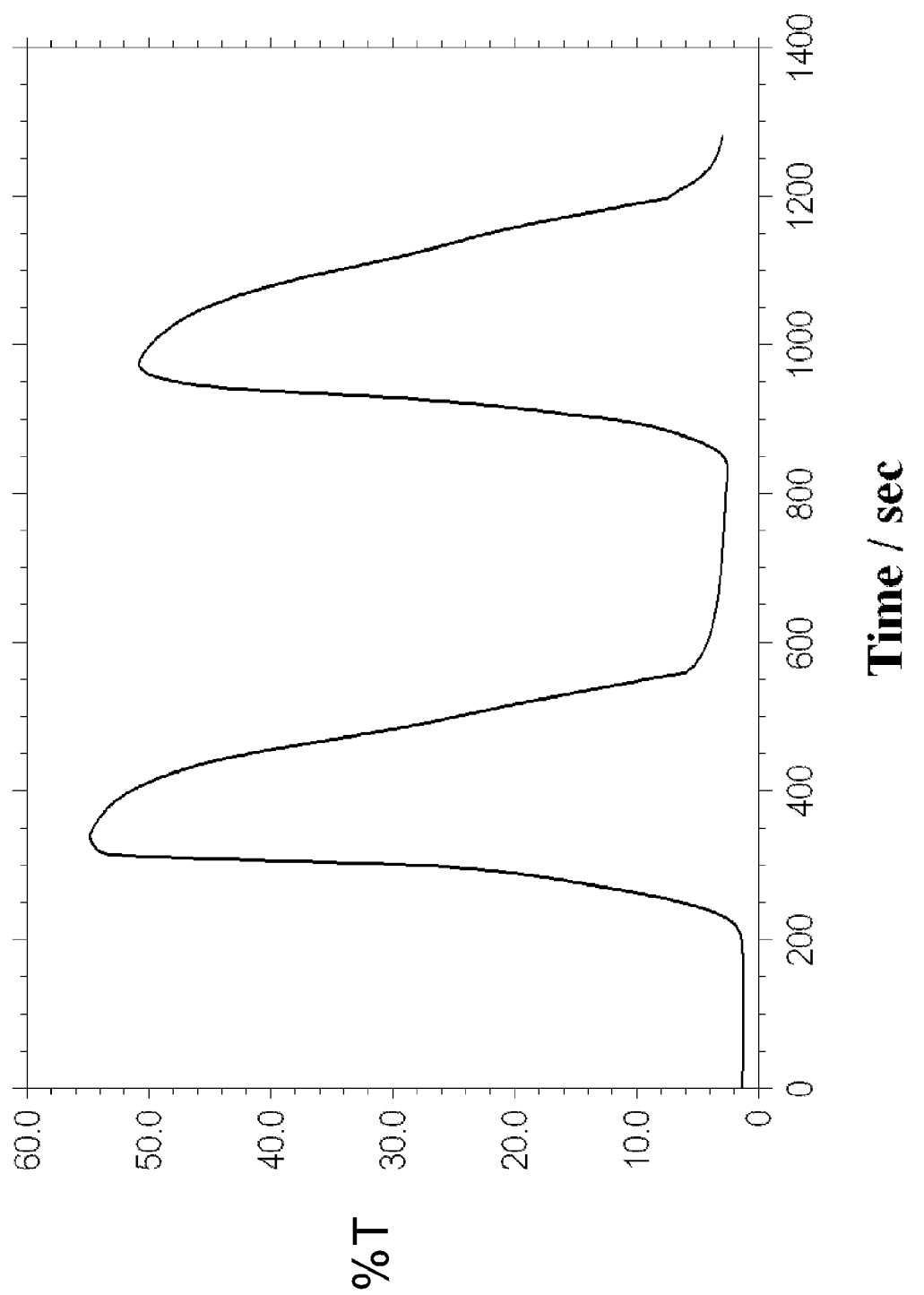
FIGS. 15A and 15B respectively depict the percentage transmittance and reflection signal characteristics for the 30-nm $Cr_3Te_2Li_{0.4}$ thin-film during wet cycling.
Figure 15B:
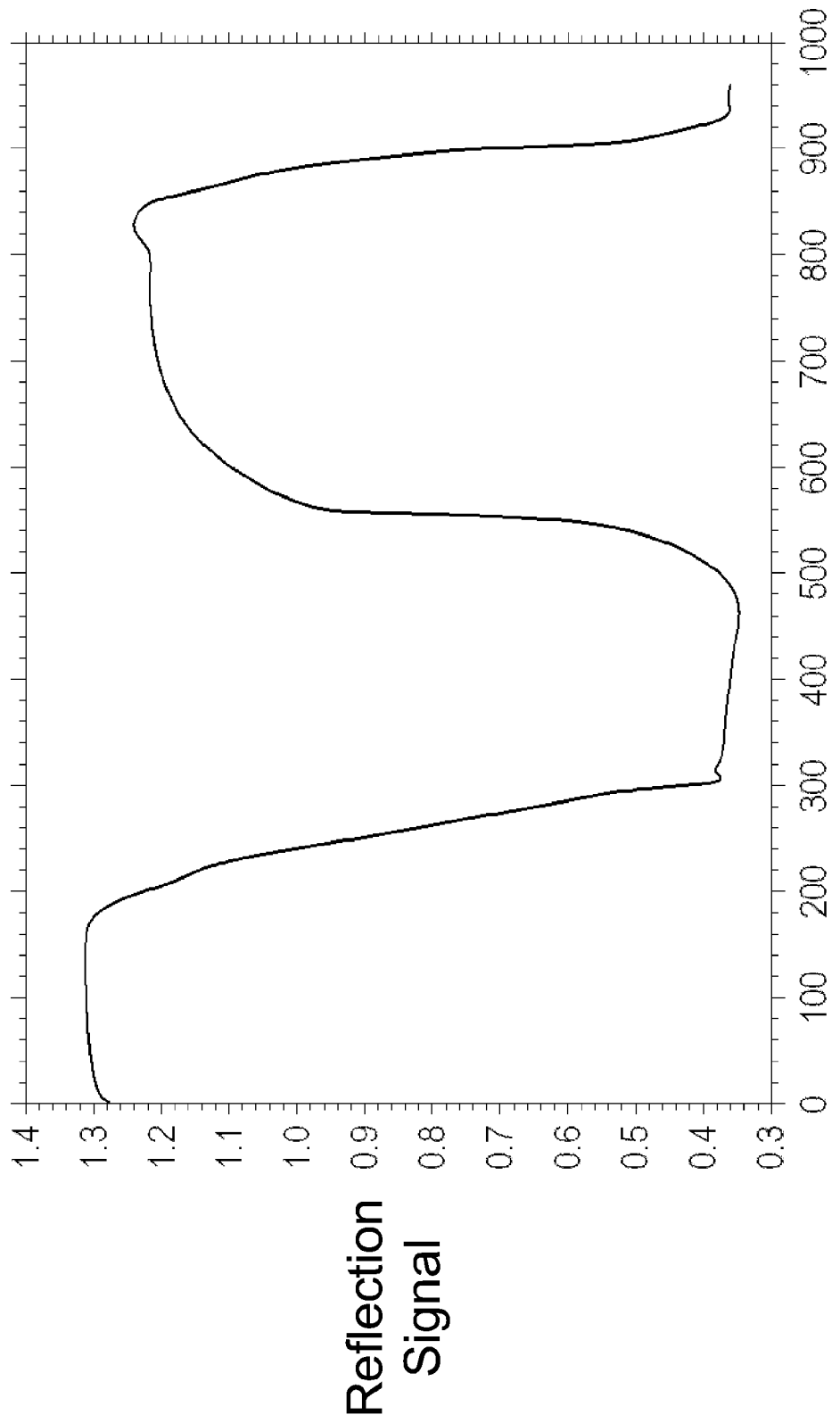

In one exemplary embodiment of the subject matter disclosed herein, a reflection-switchable thin-film material was formed by co-sputtering Te with Cr and Li at close to room temperature to form a metal-rich metal-chalcogenide thin film having a composition of $Cr_3Te_2Li_{0.4}$. Depending upon the embodiment, the thickness of the thin film material formed can be between about 1 nm and about 500 nm. FIG. 14 graphically depicts UV-Vis-NIR transmittance and reflectance spectra for a 30-nm $Cr_3Te_2Li_{0.4}$ thin film deposited on an ITO-coated glass substrate. Selection of a particular thin-film material thickness is a tradeoff between a relatively thin film, which provides a generally higher transmittance, but a generally lower reflectance and durability, and a relatively thick film, which provides a generally lower transmittance, but a generally higher reflectance and better durability. The optical switching characteristics of the 30-nm $Cr_3Te_2Li_{0.4}$ thin film were evaluated by cycling it on a potentiostat in a three-electrode electrochemical cell at 5 mV/s between 1.0 V and 2.6 V vs. Li foil (Electrolyte: 1 M $LiClO_4$ in propylene carbonate). The transmittance and reflectance of the thin-film sample were simultaneously measured in-situ versus time during the wet cycling using a Si photo-detector, which is sensitive to photons in the wavelength range of from about 400 nm to about 1100 nm. FIGS. 15A and 15B respectively depict the plots of percentage transmittance and reflection-signal intensity versus time for the $Cr_3Te_2Li_{0.4}$ thin film during the wet cycling. The transmittance of the thin film switches between about 8% and about 55%. The thin film shows excellent cyclibility with negligible degradations seen after at least about 50 cycles. It should be understood that other chalcogens and metals could be used to replace Te and Cr, respectively, which are used in this exemplary embodiment of a metal-rich metal-chalcogen thin-film material according to the subject matter disclosed herein.

Figure 16:
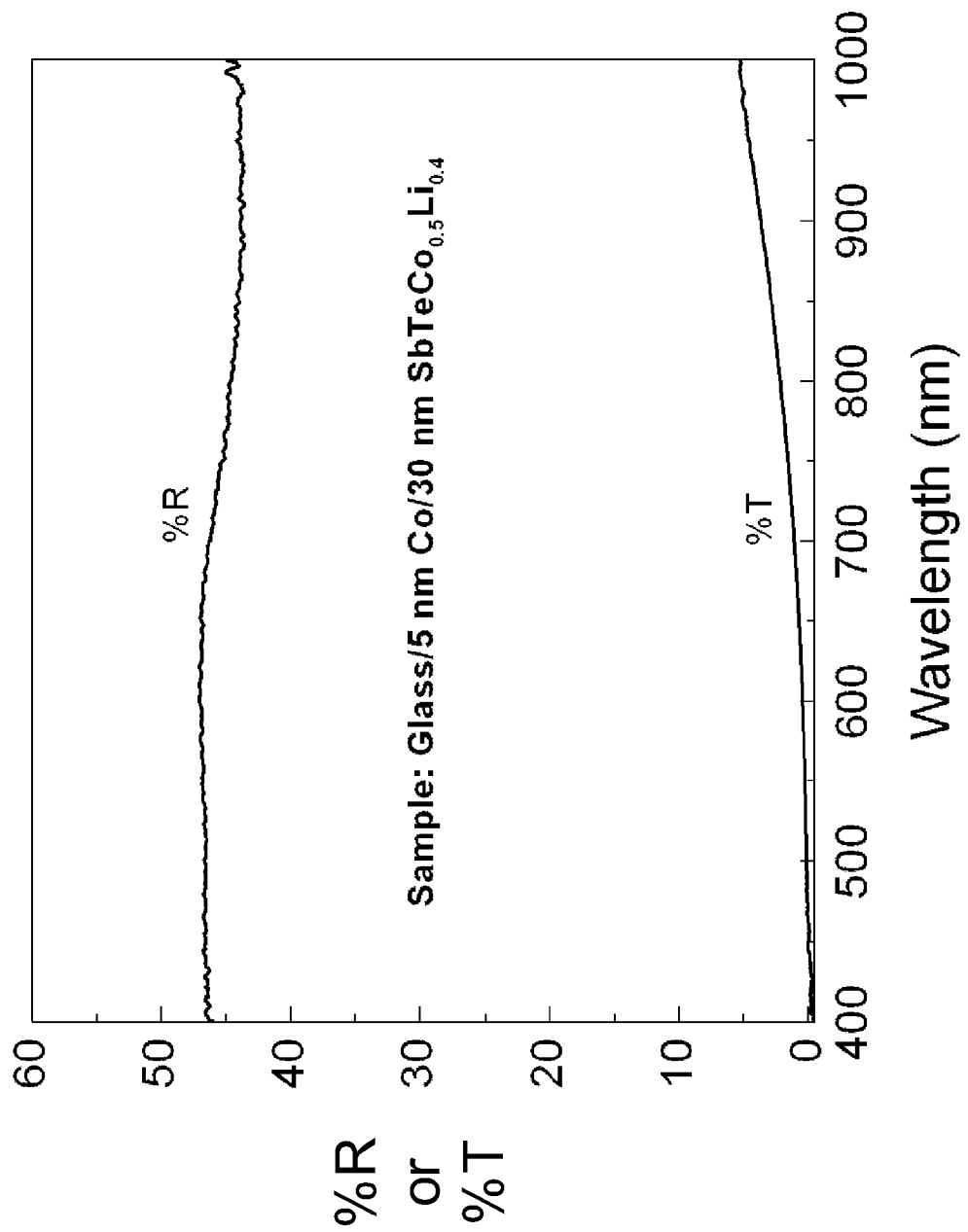
FIG. 16 graphically depicts UV-Vis-NIR transmittance and reflectance spectra for 30-nm $SbTeCo_{0.5}Li_{0.4}$ thin film deposited on 5-nm Cobalt-coated glass substrate.
Figure 17A:
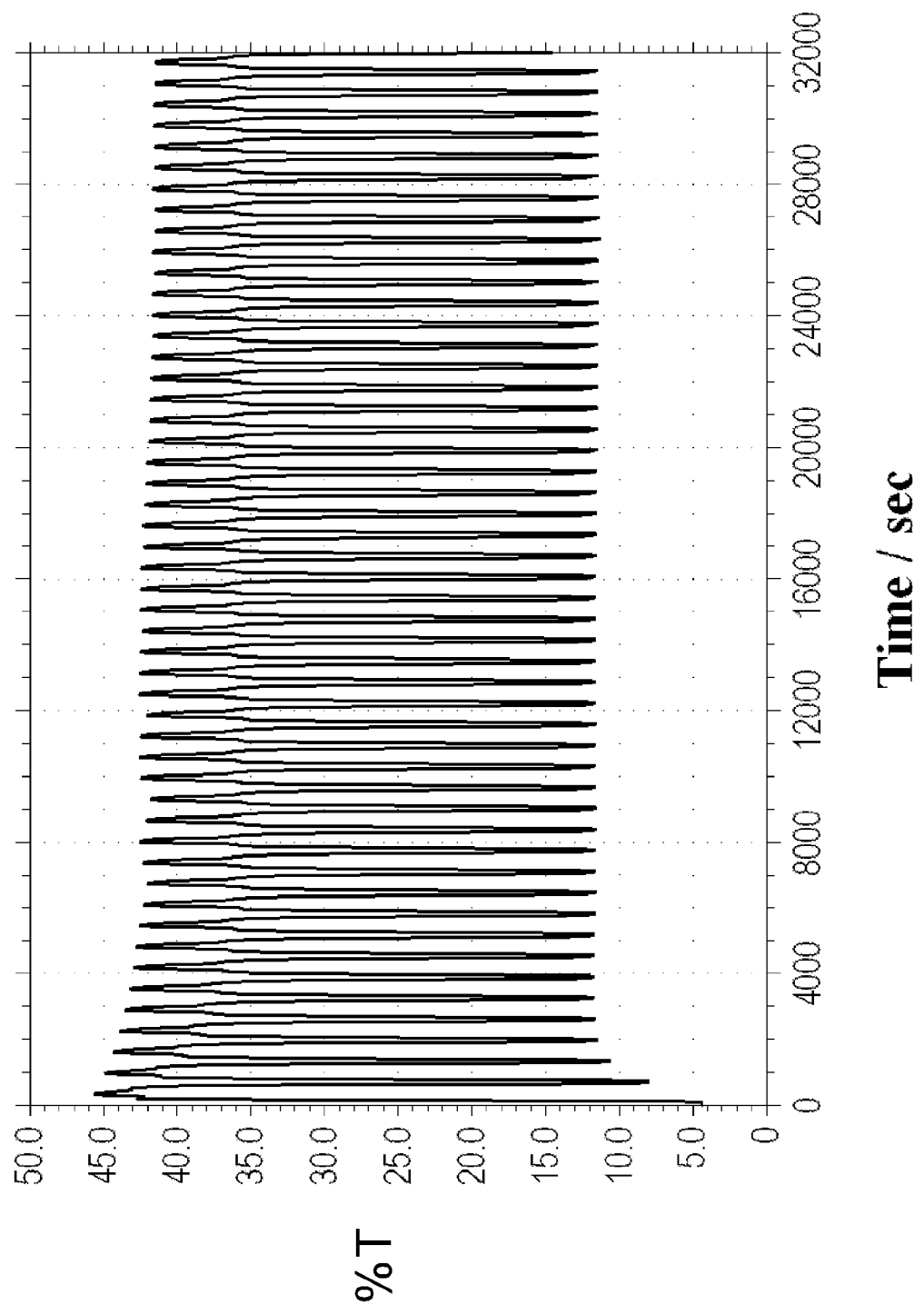
FIGS. 17A and 17B respectively depicts the percentage transmittance and reflection signal characteristics for the 30-nm $SbTeCo_{0.5}Li_{0.4}$ thin film during wet cycling.
Figure 17B:
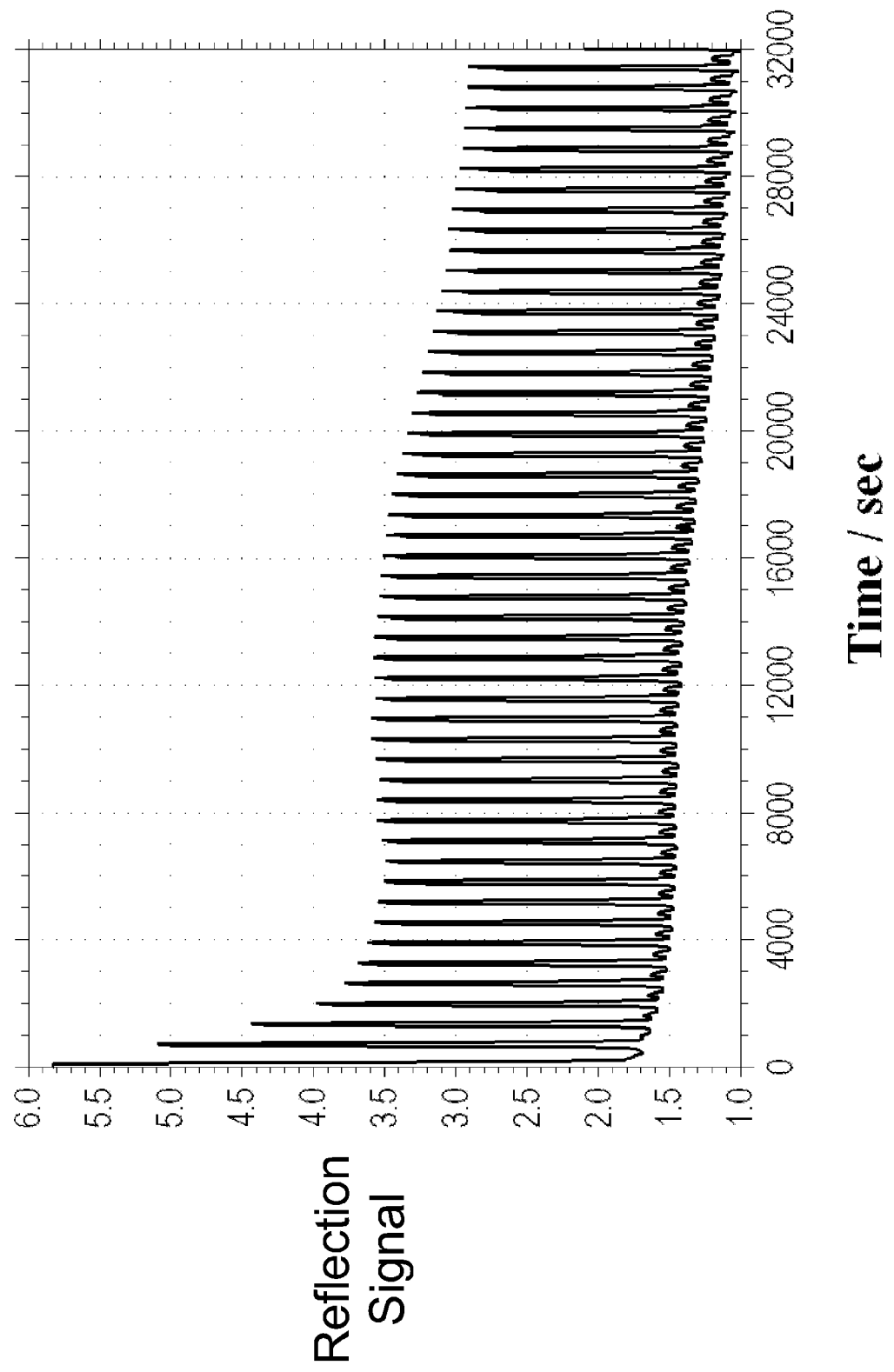

In one exemplary embodiment of the subject matter disclosed herein, a reflection-switchable thin-film material was formed by co-sputtering Te with Sb, Co, and Li at close to room temperature to form a metal-rich metal-chalcogenide thin film having a composition of $SbTeCo_{0.5}Li_{0.4}$. Depending upon the embodiment, the thickness of the thin film material formed can be between about 1 nm and about 500 nm. FIG. 16 graphically depicts UV-Vis-NIR transmittance and reflectance spectra for a 30-nm $SbTeCo_{0.5}Li_{0.4}$ thin film deposited on a 5-nm cobalt-coated glass substrate. Selection of a particular thin-film material thickness is a tradeoff between a relatively thin film, which provides a generally higher transmittance, but a generally lower reflectance and durability, and a relatively thick film, which provides a generally lower transmittance, but a generally higher reflectance and better durability. The optical switching characteristics of the 30-nm $SbTeCo_{0.5}Li_{0.4}$ thin film were evaluated by cycling it on a potentiostat in a three-electrode electrochemical cell at 5 mV/s between 0.5 V and 2.1 V vs. Li foil (Electrolyte: 1 M $LiClO_4$ in propylene carbonate). The transmittance and reflectance of the thin-film sample were simultaneously measured in-situ versus time during the wet cycling using a Si photo-detector, which is sensitive to photons in the wavelength range of from about 400 nm to about 1100 nm. FIGS. 17A and 17B respectively depict plots of percentage transmittance and reflection-signal intensity versus time for the $SbTeCo_{0.5}Li_{0.4}$ thin film during the wet cycling. The transmittance of the thin film switches between about 12% and about 44%. The thin film shows excellent cyclibility with negligible degradations seen after at least about 50 cycles. It should be understood that other chalcogens and metals could be used to replace Te, Sb and Co, respectively, which are used in this exemplary embodiment of a metal-rich metal-chalcogen thin-film material according to the subject matter disclosed herein.

Figure 18:
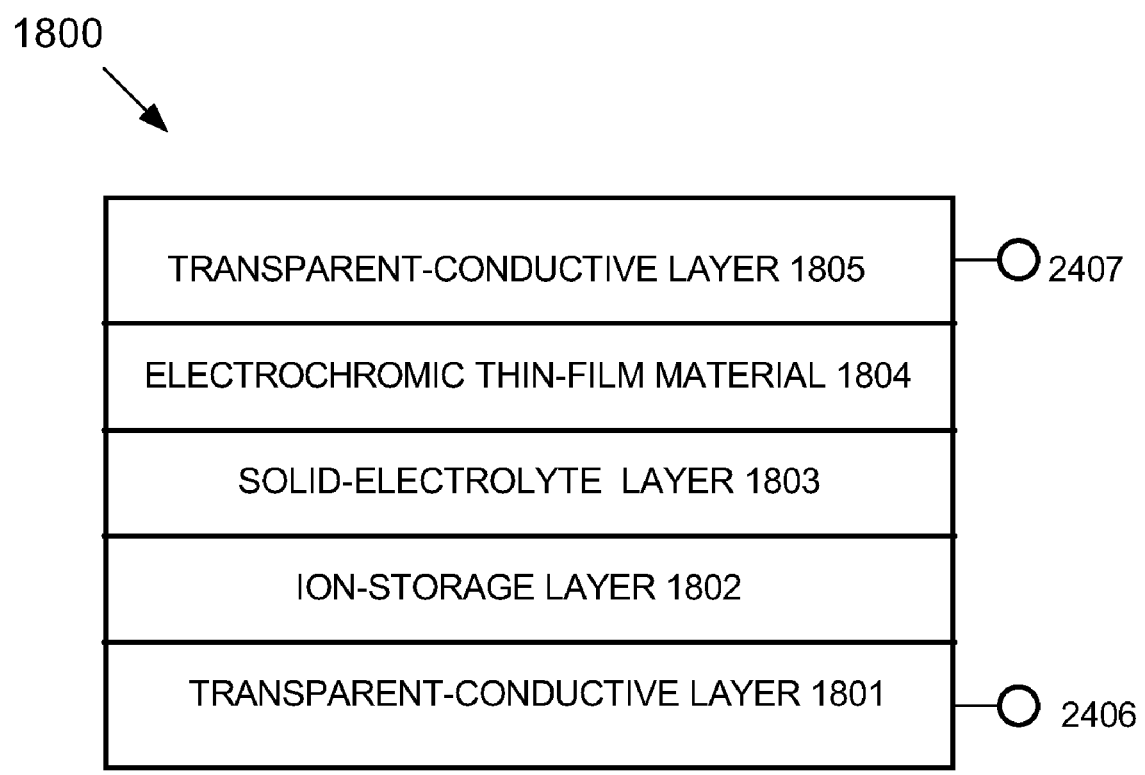
FIG. 18 depicts an exemplary embodiment of a multilayer-stack structure for a solid-state electrochromic device that utilizes an electrochromic thin-film material according to the subject matter disclosed herein.

FIG. 18 depicts an exemplary embodiment of a multilayer-stack structure 1800 for a solid-state electrochromic device that utilizes an electrochromic thin-film material according to the subject matter disclosed herein. Exemplary multilayer-stack structure 1800 comprises a transparent-conductive layer 1801, an ion-storage layer 1802 formed in a well-known manner on transparent-conductive layer 1801, a solid-electrolyte layer 1803 formed in a well-known manner on ion-storage layer 1802, an electrochromic thin-film material layer 1804 formed in a well-known manner on solid-electrolyte layer 1803, and a transparent conductive layer 1805 formed on electrochromic thin-film material layer 1804. In an alternative exemplary embodiment, an additional sublayer of a base metal could be added between transparent-conductive layer 1801 and ion-storage layer 1802 and/or electrochromic thin-film 1804 and transparent-conductor layer 1805 to further increase the sheet conductance associated with a transparent-conductor layers 1801 and/or 1805. Electrochromic thin-film material layer 1804 is formed in accordance with the subject matter disclosed herein. A protective layer formed from a material that is non-permeable to lithium, oxygen, and water could optionally be formed in a well-known manner over electrochromic thin-film material layer 1804. Examples of suitable materials for the protective layer include silicon oxide, aluminum oxide, silicon aluminum oxide, zirconium oxide, silicon carbide, and silicon oxycarbide. It should be understood that exemplary multilayer-stack structure 1800 could be used in an exemplary electrochromic device such as disclosed in co-pending and co-assigned U.S. patent Ser. No. 12/242,917, entitled "Reflection-Controllable Electrochromic Device Using a Base Metal as a Transparent Conductor," invented by Z. Wang et al., filed Oct. 1, 2008, and incorporated by reference herein. Additionally, electrical connections to exemplary multilayer-stack structure 1800 are made in a well-known manner to transparent-conductive layers 1801 and 1805, as respectively depicted by electrical connections 1806 and 1807. It should be understood that layers 1802 and 1804 could be physically interchanged in structure 1800 without adversely affecting device performance.

Although the foregoing disclosed subject matter has been described in some detail for purposes of clarity of understanding, it will be apparent that certain changes and modifications may be practiced that are within the scope of the appended claims. Accordingly, the present embodiments are to be considered as illustrative and not restrictive, and the subject matter disclosed herein is not to be limited to the details given herein, but may be modified within the scope and equivalents of the appended claims.

What is claimed is:

1. An electrochromic thin-film material, comprising a metal-rich metal-chalcogen compound of at least one metal and at least one chalcogen, in which an atomic ratio of a total amount of chalcogens to a total amount of metals other than lithium is less than about 2:1.

2. The electrochromic thin-film material according to claim 1, wherein the at least one metal comprises Ti, Zr, Hf, V, Nb, Ta, Cr, Mo, W, Mn, Sb, or Bi, or combinations thereof.

3. The electrochromic thin-film material according to claim 2, wherein the at least one chalcogen comprises O, S, Se, or Te, or combinations thereof.

4. The electrochromic thin-film material according to claim 1, wherein a thickness of the thin-film material is between about 1 nm and about 1000 nm.

5. The electrochromic thin-film material according to claim 4, wherein a thickness of the thin-film material is between about 5 nm and about 50 nm.

6. The electrochromic thin-film material according to claim 1, wherein the at least one chalcogen comprises O, S, Se, or Te, or combinations thereof.

7. The electrochromic thin-film material according to claim 1, wherein the thin-film material comprises $Nb_xTeLi_y$, in which $0.5 \leq x \leq 20$, and $0 \leq y \leq 20$.

8. The electrochromic thin-film material according to claim 1, wherein the thin-film material comprises $Mo_xTeLi_y$, in which $0.5 \leq x \leq 20$, and $0 \leq y \leq 20$.

9. The electrochromic thin-film material according to claim 1, wherein the thin-film material comprises $Ti_xTeLi_y$, in which $0.5 \leq x \leq 20$, and $0 \leq y \leq 20$.

10. The electrochromic thin-film material according to claim 1, wherein the thin-film material comprises $W_xTeLi_y$, in which $0.5 \leq x \leq 20$, and $0 \leq y \leq 20$.

11. The electrochromic thin-film material according to claim 1, wherein the thin-film material comprises $Cr_xTeLi_y$, in which $0.5 \leq x \leq 20$, and $0 \leq y \leq 20$.

12. The electrochromic thin-film material according to claim 1, wherein the thin-film material comprises $Sb_xTe\text{-}Co_yLi_z$, in which $0.5 \leq x \leq 20$, $0.01 \leq y \leq 20$, and $0 \leq z \leq 20$.

13. An all-solid-state electrochromic device, comprising:
a transparent base material; and
an electrochromic multilayer-stack structure formed on the transparent base material, the electrochromic multilayer-stack structure comprising:
a first transparent-conductive film;
an ion-storage layer formed on the first transparent-conductive film;
a solid-electrolyte layer formed on the ion-storage layer; and
an electrochromic layer formed on the solid-electrolyte layer, the electrochromic layer comprising an electrochromic thin-film material comprising a metal-rich metal-chalcogen compound of at least one metal and at least one chalcogen, in which an atomic ratio of a total amount of chalcogens to a total amount of metals other than lithium is less than about 2:1.

14. The all solid-state electrochromic device according to claim 13, wherein the at least one metal comprises Ti, Zr, Hf, V, Nb, Ta, Cr, Mo, W, Mn, Sb, or Bi, or combinations thereof.

15. The all solid-state electrochromic device according to claim 14, wherein the at least one chalcogen comprises O, S, Se, or Te, or combinations thereof.

16. The all solid-state electrochromic device according to claim 13, wherein a thickness of the thin-film material is between about 1 nm and about 1000 nm.

17. The all solid-state electrochromic device according to claim 16, wherein a thickness of the thin-film material is between about 5 nm and about 50 nm.

18. The all solid-state electrochromic device according to claim 13, wherein the at least one chalcogen comprises O, S, Se, or Te, or combinations thereof.

19. The all solid-state electrochromic device according to claim 13, wherein the thin-film material comprises at least one of $Nb_xTeLi_y$, $Mo_xTeLi_y$, $Ti_xTeLi_y$, $W_xTeLi_y$, or $Cr_xTeLi_y$, or combinations thereof, in which $0.5 \leq x \leq 20$, and $0 \leq y \leq 20$.

20. The all solid-state electrochromic device according to claim 13, wherein the thin-film material comprises $Sb_xTe\text{-}Co_yLi_z$, in which $0.5 \leq x \leq 20$, $0.01 \leq y \leq 20$, and $0 \leq z \leq 20$.

* * * * *